(12) United States Patent
Cutting et al.

(10) Patent No.: US 12,239,127 B2
(45) Date of Patent: Mar. 4, 2025

(54) THERMAL CAPACITORS, SYSTEMS, AND METHODS FOR RAPID FREEZING OR HEATING OF BIOLOGICAL MATERIALS

(71) Applicant: Sartorius Stedim North America Inc., Bohemia, NY (US)

(72) Inventors: Jonathan Cutting, Heber City, UT (US); Alexander Kaiser, Lancaster, NY (US)

(73) Assignee: Sartorius Stedim North America Inc., Bohemia, NY (US)

( * ) Notice: Subject to any disclaimer, the term of this patent is extended or adjusted under 35 U.S.C. 154(b) by 358 days.

(21) Appl. No.: 17/386,828

(22) Filed: Jul. 28, 2021

(65) Prior Publication Data

US 2023/0032121 A1 Feb. 2, 2023

(51) Int. Cl.
*A01N 1/02* (2006.01)

(52) U.S. Cl.
CPC .................... *A01N 1/0257* (2013.01)

(58) Field of Classification Search
CPC ..... F28D 2020/0008; F28D 2020/0021; F28D 2021/005; A01N 1/0242; A01N 1/0252; F25D 2400/30
See application file for complete search history.

(56) References Cited

U.S. PATENT DOCUMENTS

| | | |
|---|---|---|
| 553,734 A | 1/1896 | Iredale |
| 858,051 A | 6/1907 | Allen |
| 1,438,899 A | 12/1922 | Cassidy |
| 1,577,539 A | 3/1926 | Hamilton |
| 1,834,085 A | 12/1931 | Bloom |
| 2,186,908 A | 1/1940 | Page et al. |
| 2,191,495 A | 2/1940 | Nesset |
| 2,226,312 A | 12/1940 | Kuhns |
| 2,439,572 A | 4/1948 | Baruch |
| 2,460,542 A | 2/1949 | Smith |
| 2,744,661 A | 5/1956 | Davis |
| 3,130,260 A | 4/1964 | Gray |

(Continued)

FOREIGN PATENT DOCUMENTS

| | | |
|---|---|---|
| AU | 199912501 A | 8/1999 |
| AU | 2002354684 A1 | 5/2003 |

(Continued)

OTHER PUBLICATIONS

H. Vatankhah et al., Geometry Simplification of Wrinkled Wall Semi-rigid Aluminum Containers in Heat Transfer Simulation, Journal of Agricultural Science and Technology, Jan. 2016 vol. 18: 122-133.

(Continued)

*Primary Examiner* — Lionel Nouketcha
(74) *Attorney, Agent, or Firm* — Womble Bond Dickinson (US) LLP

(57) ABSTRACT

A thermal capacitor includes a shell and a PCM. The shell includes a first major surface that is configured to contact a container including media to be frozen. The shell defines a cavity in which the PCM is disposed. The PCM has a transition temperature in a range of −80 degrees Celsius to −50 degrees Celsius and is configured to rapidly freeze media from room temperature to −60 degrees Celsius with the container including the media in contact with the shell in an enclosed space.

19 Claims, 15 Drawing Sheets

(56) References Cited

U.S. PATENT DOCUMENTS

| | | | |
|---|---|---|---|
| 3,276,447 | A | 10/1966 | Hamilton |
| 3,354,012 | A | 11/1967 | Forman et al. |
| 3,360,008 | A | 12/1967 | Papale et al. |
| 3,458,619 | A | 7/1969 | Prochaska |
| 3,467,270 | A | 9/1969 | Eady |
| 3,499,568 | A | 3/1970 | Riera |
| 3,793,672 | A | 2/1974 | Wetmore |
| 3,794,333 | A | 2/1974 | Czernik et al. |
| 3,938,035 | A | 2/1976 | Fletcher et al. |
| 4,032,311 | A | 6/1977 | Bohmrich et al. |
| 4,045,860 | A | 9/1977 | Winckler |
| 4,080,989 | A | 3/1978 | Chapelsky et al. |
| 4,116,199 | A | 9/1978 | Bryne |
| 4,165,814 | A | 8/1979 | Seel |
| 4,174,743 | A | 11/1979 | Beny et al. |
| 4,334,993 | A | 6/1982 | Norton |
| 4,335,717 | A | 6/1982 | Bujan et al. |
| 4,336,802 | A | 6/1982 | Stone et al. |
| 4,360,776 | A | 11/1982 | Bauman |
| 4,387,762 | A | 6/1983 | Rinderle |
| 4,396,016 | A | 8/1983 | Becker |
| 4,499,148 | A | 2/1985 | Goodale et al. |
| 4,581,012 | A | 4/1986 | Brown et al. |
| 4,676,898 | A | 6/1987 | Saxena |
| 4,700,861 | A | 10/1987 | Neward |
| 4,701,159 | A | 10/1987 | Brown et al. |
| 4,715,359 | A | 12/1987 | Ryo |
| 4,747,519 | A | 5/1988 | Green et al. |
| 4,784,299 | A | 11/1988 | Stenger |
| 4,785,974 | A | 11/1988 | Rudick et al. |
| 4,863,030 | A | 9/1989 | Bayer et al. |
| 4,938,371 | A | 7/1990 | Vercillo |
| 4,993,573 | A | 2/1991 | Freidel et al. |
| 5,025,955 | A | 6/1991 | Stenger |
| 5,052,105 | A | 10/1991 | Mische et al. |
| D324,568 | S | 3/1992 | Marken |
| 5,100,010 | A | 3/1992 | Waters |
| 5,114,045 | A | 5/1992 | Herpe |
| 5,197,895 | A | 3/1993 | Stupecky |
| 5,219,185 | A | 6/1993 | Oddenino |
| 5,245,955 | A | 9/1993 | Husted |
| 5,250,041 | A | 10/1993 | Folden et al. |
| 5,300,060 | A | 4/1994 | Nelson |
| 5,350,080 | A | 9/1994 | Brown et al. |
| 5,355,684 | A | 10/1994 | Guice |
| 5,358,872 | A | 10/1994 | Mussi et al. |
| 5,362,642 | A | 11/1994 | Kern |
| 5,381,839 | A | 1/1995 | Dowd |
| H1430 | H | 4/1995 | Apel et al. |
| 5,441,197 | A | 8/1995 | Gellert et al. |
| 5,476,116 | A | 12/1995 | Price et al. |
| 5,478,119 | A | 12/1995 | Dye |
| 5,492,531 | A | 2/1996 | Post et al. |
| 5,505,495 | A | 4/1996 | Godeau |
| 5,507,904 | A | 4/1996 | Fisher et al. |
| 5,518,047 | A | 5/1996 | Alexandrowski |
| 5,522,155 | A | 6/1996 | Bradford |
| 5,695,215 | A | 12/1997 | Headley et al. |
| 5,733,452 | A | 3/1998 | Whitlock |
| 5,839,471 | A | 11/1998 | Yang |
| 5,964,100 | A | 10/1999 | Wisniewski |
| 5,988,422 | A | 11/1999 | Vallot |
| 6,032,543 | A | 3/2000 | Arthun et al. |
| 6,039,718 | A | 3/2000 | Niedospial, Jr. |
| 6,062,440 | A | 5/2000 | Murray et al. |
| 6,071,005 | A | 6/2000 | Ekambaram et al. |
| 6,079,215 | A | 6/2000 | Wisniewski |
| 6,095,356 | A | 8/2000 | Rits |
| 6,158,484 | A | 12/2000 | Greenlee |
| 6,165,362 | A | 12/2000 | Nohren et al. |
| 6,170,269 | B1 | 1/2001 | Wisniewski |
| 6,179,823 | B1 | 1/2001 | Niedospial |
| 6,199,297 | B1 | 3/2001 | Wisniewski |
| 6,223,938 | B1 | 5/2001 | Pare et al. |
| 6,225,562 | B1 | 5/2001 | Fujishita et al. |
| 6,234,545 | B1 | 5/2001 | Babuder et al. |
| 6,290,265 | B1 | 9/2001 | Warburton-Pitt et al. |
| 6,334,888 | B1 | 1/2002 | Collas et al. |
| 6,337,205 | B1 | 1/2002 | Wisniewski |
| 6,340,033 | B2 | 1/2002 | Paradis et al. |
| 6,354,636 | B2 | 3/2002 | Matsuzawa et al. |
| 6,371,643 | B2 | 4/2002 | Saad et al. |
| 6,430,033 | B1 | 8/2002 | Mitsui et al. |
| 6,453,683 | B1 | 9/2002 | Wisniewski et al. |
| 6,482,332 | B1 * | 11/2002 | Malach .................. C09K 5/066 165/104.19 |
| 6,499,618 | B1 | 12/2002 | Leclerc et al. |
| 6,520,505 | B1 | 2/2003 | Koegler et al. |
| 6,523,711 | B1 | 2/2003 | Hughes et al. |
| 6,578,802 | B1 | 6/2003 | Thier |
| 6,581,637 | B2 | 6/2003 | Hamamoto et al. |
| 6,610,200 | B1 | 8/2003 | Leijon et al. |
| 6,631,616 | B2 | 10/2003 | Wisniewski et al. |
| 6,635,414 | B2 | 10/2003 | Wisniewski |
| 6,670,175 | B2 | 12/2003 | Wang et al. |
| 6,684,646 | B2 | 2/2004 | Voute et al. |
| 6,698,213 | B2 | 3/2004 | Voute et al. |
| 6,719,037 | B2 | 4/2004 | Crook |
| 6,733,730 | B1 | 5/2004 | Griffiths et al. |
| 6,779,575 | B1 | 8/2004 | Arthun |
| 6,786,054 | B2 | 9/2004 | Voute et al. |
| 6,808,675 | B1 | 10/2004 | Coelho et al. |
| 6,858,424 | B2 | 2/2005 | Wisniewski |
| 6,905,595 | B2 | 6/2005 | Gebauer |
| 6,945,056 | B2 | 9/2005 | Brown et al. |
| 6,951,228 | B2 | 10/2005 | Steigerwalt et al. |
| 6,966,581 | B2 | 11/2005 | Mastropaolo |
| 6,994,699 | B2 | 2/2006 | Houwaert et al. |
| 6,996,995 | B2 | 2/2006 | Voute et al. |
| 7,087,047 | B2 | 8/2006 | Kraus et al. |
| 7,093,859 | B2 | 8/2006 | Warburton-Pitt et al. |
| 7,104,074 | B2 | 9/2006 | Voute et al. |
| 7,137,261 | B2 | 11/2006 | Brown et al. |
| 7,140,404 | B2 | 11/2006 | Cupples et al. |
| 7,228,688 | B2 | 6/2007 | Voute et al. |
| 7,293,477 | B2 | 11/2007 | Furey et al. |
| 7,306,583 | B2 | 12/2007 | Goudaliez et al. |
| 7,353,658 | B2 | 4/2008 | Voute et al. |
| 7,407,612 | B2 | 8/2008 | Warburton-Pitt et al. |
| 7,497,130 | B2 | 3/2009 | Woods et al. |
| 7,500,949 | B2 | 3/2009 | Gottlieb et al. |
| 7,563,243 | B2 | 7/2009 | Mendels |
| 7,686,037 | B2 | 3/2010 | Krywitsky |
| 7,708,923 | B1 | 5/2010 | Helicke et al. |
| 7,731,241 | B2 | 6/2010 | Aoki et al. |
| 7,784,630 | B2 | 8/2010 | Walsh |
| 7,874,467 | B2 | 1/2011 | Pardes et al. |
| 7,931,859 | B2 | 4/2011 | Mlodzinski et al. |
| 8,008,065 | B2 | 8/2011 | Selker et al. |
| 8,025,271 | B2 | 9/2011 | Kolodner et al. |
| 8,028,532 | B2 | 10/2011 | Voute et al. |
| 8,092,409 | B2 | 1/2012 | Miros et al. |
| 8,177,123 | B2 | 5/2012 | Voute et al. |
| 8,196,614 | B2 | 6/2012 | Kriheli |
| 8,235,067 | B2 | 8/2012 | Gagne et al. |
| 8,281,672 | B2 | 10/2012 | Lee et al. |
| 8,281,807 | B2 | 10/2012 | Trombley et al. |
| 8,336,313 | B2 | 12/2012 | McMasters et al. |
| 8,342,737 | B2 | 1/2013 | Greller et al. |
| 8,371,132 | B2 | 2/2013 | Cutting et al. |
| 8,372,058 | B2 | 2/2013 | Schilp et al. |
| 8,448,457 | B2 | 5/2013 | Cutting et al. |
| 8,505,396 | B2 | 8/2013 | Zumbrum |
| 8,505,586 | B2 | 8/2013 | Zumbrum |
| 8,524,174 | B2 | 9/2013 | Yobas et al. |
| 8,550,703 | B2 | 10/2013 | Cutting |
| 8,562,572 | B2 | 10/2013 | Proulx et al. |
| 8,573,424 | B2 | 11/2013 | Dubs et al. |
| 8,651,327 | B2 | 2/2014 | Cutting et al. |
| 8,690,120 | B2 | 4/2014 | Hartnett et al. |
| 8,863,532 | B2 | 10/2014 | Voute et al. |
| 8,865,427 | B2 | 10/2014 | Poo et al. |
| 8,871,317 | B2 | 10/2014 | Cai et al. |
| 8,905,255 | B2 | 12/2014 | Leoncavallo et al. |

(56) References Cited

U.S. PATENT DOCUMENTS

| | | |
|---|---|---|
| 9,095,693 B2 | 8/2015 | Buisson |
| 9,161,527 B2 | 10/2015 | Cutting et al. |
| 9,211,364 B2 | 12/2015 | Croizat et al. |
| 9,227,046 B1 | 1/2016 | Douglas |
| 9,259,563 B2 | 2/2016 | Klingel et al. |
| 9,301,520 B2 | 4/2016 | Cutting et al. |
| 9,357,763 B2 | 6/2016 | Cullis et al. |
| 9,358,333 B2 | 6/2016 | Trombley, III et al. |
| 9,376,224 B2 | 6/2016 | Gonnelli et al. |
| 9,376,305 B2 | 6/2016 | Zumbrum |
| 9,403,135 B2 | 8/2016 | Cutting |
| 9,526,886 B2 | 12/2016 | Mastri et al. |
| 9,528,632 B2 | 12/2016 | Glaun |
| 9,550,969 B2 | 1/2017 | Chotteau et al. |
| 9,597,732 B2 | 3/2017 | Lewis et al. |
| 9,675,520 B2 | 6/2017 | Rogers et al. |
| 9,700,844 B2 | 7/2017 | Schick |
| 9,706,793 B2 | 7/2017 | Hayakawa |
| 9,726,314 B2 | 8/2017 | Py |
| 9,738,939 B2 | 8/2017 | Scholz |
| 9,771,629 B2 | 9/2017 | Soloway |
| 9,784,111 B2 | 10/2017 | Luo et al. |
| 9,802,172 B2 | 10/2017 | Danders et al. |
| 9,857,002 B2 | 1/2018 | Ott et al. |
| 9,901,729 B2 | 2/2018 | Vigna et al. |
| 9,907,728 B2 | 3/2018 | Kyle et al. |
| 9,926,185 B2 | 3/2018 | Davis et al. |
| 9,933,113 B2 | 4/2018 | Cutting et al. |
| 9,938,128 B2 | 4/2018 | Py et al. |
| 9,944,510 B2 | 4/2018 | Zumbrum |
| 9,975,753 B1 | 5/2018 | Zumbrum et al. |
| 9,987,508 B2 | 6/2018 | Cockerham et al. |
| 9,999,568 B2 | 6/2018 | Hobson et al. |
| 10,006,567 B2 | 6/2018 | Zumbrum |
| 10,031,033 B2 | 7/2018 | Cutting |
| 10,272,639 B2 | 4/2019 | DeCoste et al. |
| 10,415,866 B2 | 9/2019 | Brabenec et al. |
| 10,486,959 B2 | 11/2019 | Zumbrum |
| D873,555 S | 1/2020 | Wurm |
| 10,549,900 B2 | 2/2020 | McCormick |
| 10,689,611 B2 | 6/2020 | Coupier |
| 11,207,239 B2 | 12/2021 | Wurm |
| 11,319,201 B2 | 5/2022 | Zumbrum et al. |
| 2001/0015226 A1 | 8/2001 | Hamamoto et al. |
| 2001/0017161 A1 | 8/2001 | Paradis et al. |
| 2001/0035093 A1 | 11/2001 | Yokota |
| 2002/0162648 A1 | 11/2002 | Crook |
| 2002/0185186 A1 | 12/2002 | Juliar et al. |
| 2003/0052074 A1 | 3/2003 | Chang et al. |
| 2003/0080126 A1 | 5/2003 | Voute et al. |
| 2003/0208151 A1 | 11/2003 | Kraus et al. |
| 2004/0006999 A1 | 1/2004 | Brown et al. |
| 2004/0026265 A1 | 2/2004 | Nadanami et al. |
| 2004/0064086 A1 | 4/2004 | Gottlieb et al. |
| 2004/0099154 A1 | 5/2004 | Raschle |
| 2004/0254560 A1 | 12/2004 | Coelho et al. |
| 2004/0260265 A1 | 12/2004 | Goudaliez et al. |
| 2005/0067367 A1 | 3/2005 | Carballido |
| 2005/0115917 A1 | 6/2005 | Odet et al. |
| 2005/0124935 A1 | 6/2005 | McMichael |
| 2005/0132821 A1 | 6/2005 | Furey |
| 2005/0142315 A1 | 6/2005 | Desimone et al. |
| 2005/0167390 A1 | 8/2005 | Dubs et al. |
| 2005/0256461 A1 | 11/2005 | DiFiore et al. |
| 2006/0010991 A1 | 1/2006 | Woods et al. |
| 2006/0024818 A1 | 2/2006 | Conconi |
| 2006/0086758 A1 | 4/2006 | Coles |
| 2006/0272432 A1 | 12/2006 | Belongia |
| 2007/0193375 A1 | 8/2007 | Pandori et al. |
| 2007/0290004 A1 | 12/2007 | Lee |
| 2008/0087626 A1 | 4/2008 | Tsai |
| 2008/0277926 A1 | 11/2008 | Inman, Jr. et al. |
| 2008/0281200 A1 | 11/2008 | Voic et al. |
| 2009/0049988 A1 | 2/2009 | Meindl |
| 2009/0090689 A1 | 4/2009 | Walsh |
| 2009/0158755 A1 | 6/2009 | Cutting et al. |
| 2009/0217677 A1 | 9/2009 | Shin et al. |
| 2009/0236374 A1 | 9/2009 | Pardes et al. |
| 2010/0065305 A1 | 3/2010 | Bernauer |
| 2010/0123094 A1 | 5/2010 | Zumbrum |
| 2010/0133459 A1 | 6/2010 | Zumbrum |
| 2010/0154569 A1 | 6/2010 | Guedon |
| 2010/0158759 A1 | 6/2010 | Olivier |
| 2010/0164176 A1 | 7/2010 | Beele |
| 2010/0183251 A1 | 7/2010 | Neltner et al. |
| 2010/0288382 A1 | 11/2010 | Event et al. |
| 2010/0318069 A1 | 12/2010 | Hall et al. |
| 2011/0018206 A1 | 1/2011 | Beele |
| 2011/0120151 A1 | 5/2011 | Cutting et al. |
| 2011/0121558 A1 | 5/2011 | Kanner |
| 2011/0155258 A1 | 6/2011 | Zumbrum |
| 2011/0155274 A1 | 6/2011 | Zumbrum |
| 2011/0247349 A1 | 10/2011 | Cutting et al. |
| 2012/0064274 A1 | 3/2012 | Cai et al. |
| 2012/0074051 A1 | 3/2012 | Gebauer et al. |
| 2012/0090160 A1 | 4/2012 | Shaham |
| 2013/0062355 A1 | 3/2013 | Shulman |
| 2013/0304039 A1 | 11/2013 | Chung |
| 2014/0074015 A1 | 3/2014 | Mastri et al. |
| 2014/0076454 A1 | 3/2014 | Kjar |
| 2014/0103077 A1 | 4/2014 | Zumbrum |
| 2014/0135719 A1 | 5/2014 | Jaeb et al. |
| 2014/0137519 A1 | 5/2014 | Goodwin |
| 2014/0190570 A1 | 7/2014 | Zumbrum |
| 2014/0191501 A1 | 7/2014 | Brugger et al. |
| 2014/0311170 A1* | 10/2014 | Mills .................... F25D 11/003 62/62 |
| 2014/0353878 A1 | 12/2014 | Driessen et al. |
| 2015/0080814 A1 | 3/2015 | Lambert et al. |
| 2015/0108034 A1 | 4/2015 | Deutschle et al. |
| 2015/0114515 A1 | 4/2015 | Phallen |
| 2016/0073626 A1 | 3/2016 | Cutting et al. |
| 2016/0114922 A1 | 4/2016 | Boira Bonhora |
| 2016/0195208 A1 | 7/2016 | Cassiday et al. |
| 2016/0195218 A1 | 7/2016 | Cutting et al. |
| 2016/0199914 A1 | 7/2016 | Potter |
| 2016/0202101 A1 | 7/2016 | Sparks et al. |
| 2016/0238324 A1 | 8/2016 | Butcher et al. |
| 2016/0311674 A1 | 10/2016 | Zumbrum |
| 2016/0361488 A1 | 12/2016 | Perrenoud et al. |
| 2017/0021355 A1 | 1/2017 | Olivier et al. |
| 2017/0102089 A1 | 4/2017 | Griffin, Jr. et al. |
| 2017/0167652 A1 | 6/2017 | Snyder et al. |
| 2017/0173495 A1 | 6/2017 | Valery et al. |
| 2017/0204989 A1 | 7/2017 | Burkhart et al. |
| 2017/0219134 A1 | 8/2017 | Kedor et al. |
| 2017/0239141 A1 | 8/2017 | Davis et al. |
| 2017/0306766 A1 | 10/2017 | Munzer |
| 2018/0050856 A1 | 2/2018 | Baud et al. |
| 2018/0125754 A1 | 5/2018 | Sanchez et al. |
| 2018/0125757 A1 | 5/2018 | Sanchez et al. |
| 2018/0128707 A1 | 5/2018 | Sanchez et al. |
| 2018/0163898 A1 | 6/2018 | Von Arb |
| 2018/0238475 A1 | 8/2018 | Zumbrum |
| 2019/0107316 A1 | 4/2019 | Amnitz et al. |
| 2019/0143093 A1 | 5/2019 | Zumbrum et al. |
| 2019/0152676 A1 | 5/2019 | Murphy |
| 2019/0191693 A1 | 6/2019 | Johnson et al. |
| 2020/0107993 A1 | 4/2020 | Cutting et al. |
| 2020/0115669 A1 | 4/2020 | Bremer, Jr. |
| 2020/0163326 A1* | 5/2020 | De Coppi ........... A61L 27/3873 |
| 2020/0180938 A1 | 6/2020 | Zumbrum et al. |
| 2020/0217579 A1 | 7/2020 | Wurm |
| 2020/0318884 A1 | 10/2020 | Recine et al. |
| 2020/0400385 A1* | 12/2020 | Van Bael ................ F28D 20/02 |
| 2021/0007932 A1 | 1/2021 | Alford et al. |
| 2021/0024338 A1 | 1/2021 | Zumbrum et al. |
| 2021/0137787 A1 | 5/2021 | Schyver |
| 2021/0188615 A1 | 6/2021 | Zumbrum et al. |

(56) References Cited

U.S. PATENT DOCUMENTS

| | | | |
|---|---|---|---|
| 2021/0195891 A1* | 7/2021 | Uygun | A01N 1/0284 |
| 2022/0026130 A1 | 1/2022 | Schyver | |

FOREIGN PATENT DOCUMENTS

| | | |
|---|---|---|
| AU | 2002340351 A1 | 7/2003 |
| AU | 2002354684 B2 | 2/2007 |
| AU | 2018415553 A1 | 11/2020 |
| AU | 2019252550 A1 | 11/2020 |
| AU | 2019445053 A1 | 5/2021 |
| CA | 2466122 A1 | 5/2003 |
| CA | 3071725 A1 | 2/2019 |
| CA | 3095407 A1 | 10/2019 |
| CA | 3096893 A1 | 10/2019 |
| CA | 3120344 A1 | 10/2020 |
| CN | 1229018 C | 11/2005 |
| CN | 1242670 C | 2/2006 |
| CN | 1283966 C | 11/2006 |
| CN | 1288405 C | 12/2006 |
| CN | 1315374 C | 5/2007 |
| CN | 102218226 A | 10/2011 |
| CN | 101932235 B | 6/2014 |
| CN | 103002856 B | 8/2015 |
| CN | 205150679 U | 4/2016 |
| CN | 104719284 B | 5/2017 |
| CN | 105658313 B | 9/2017 |
| CN | 105228446 B | 6/2018 |
| CN | 109153181 A | 1/2019 |
| CN | 112165859 A | 1/2021 |
| CN | 113039073 A | 6/2021 |
| CN | 216270955 U | 4/2022 |
| DE | 3505492 A1 | 8/1986 |
| DE | 102014104334 A1 | 10/2015 |
| DE | 102016005049 A1 | 10/2017 |
| DE | 102016006916 A1 | 12/2017 |
| DE | 102016008826 A1 | 1/2018 |
| DE | 102016117539 A1 | 3/2018 |
| DE | 102017010629 A1 | 5/2019 |
| DE | 102017127015 A1 | 5/2019 |
| EP | 960311 B1 | 11/2005 |
| EP | 1591517 A1 | 11/2005 |
| EP | 1196211 B1 | 12/2005 |
| EP | 1441585 B1 | 5/2006 |
| EP | 1441586 B1 | 6/2006 |
| EP | 1542894 B1 | 6/2006 |
| EP | 1389292 B1 | 10/2008 |
| EP | 1543279 B1 | 10/2008 |
| EP | 1700764 B1 | 12/2008 |
| EP | 1407202 B1 | 1/2010 |
| EP | 2144589 A1 | 1/2010 |
| EP | 1625866 B1 | 9/2012 |
| EP | 2503978 A2 | 10/2012 |
| EP | 2622340 A1 | 8/2013 |
| EP | 2802415 A1 | 11/2014 |
| EP | 2805737 A1 | 11/2014 |
| EP | 2907649 A1 | 8/2015 |
| EP | 2240012 B1 | 10/2015 |
| EP | 2346469 B1 | 3/2016 |
| EP | 2012585 B1 | 11/2016 |
| EP | 2113171 B1 | 11/2016 |
| EP | 2310486 B1 | 1/2017 |
| EP | 2990900 B1 | 4/2017 |
| EP | 3199023 A1 | 8/2017 |
| EP | 3206816 A1 | 8/2017 |
| EP | 3215286 A1 | 9/2017 |
| EP | 3027531 B1 | 11/2017 |
| EP | 2976264 B1 | 1/2018 |
| EP | 3381430 A1 | 10/2018 |
| EP | 3772935 A1 | 2/2021 |
| EP | 3773412 A1 | 2/2021 |
| EP | 3795672 A1 | 3/2021 |
| EP | 3952642 A1 | 2/2022 |
| FR | 3003644 B1 | 3/2015 |
| FR | 3003550 B1 | 5/2016 |
| GB | 0781520 A | 8/1957 |
| GB | 2587070 A * | 3/2021 | C09K 5/02 |
| IL | 277919 A | 11/2020 |
| IL | 282540 A | 6/2021 |
| IN | 200400053 P1 | 2/2006 |
| IN | 200401014 P1 | 7/2006 |
| IN | 200500919 P1 | 12/2008 |
| IN | 200500914 P1 | 3/2009 |
| IN | 242976 B | 9/2010 |
| IN | 247179 B | 4/2011 |
| IN | 201002386 P2 | 11/2011 |
| IN | 274809 B | 8/2016 |
| IN | 201737007476 A | 8/2017 |
| IN | 330556 B | 1/2020 |
| IN | 202037005542 A | 5/2020 |
| JP | 2001031126 A | 2/2001 |
| JP | 2003125753 A | 5/2003 |
| JP | 2007176537 A | 7/2007 |
| JP | 4466778 B1 | 5/2010 |
| JP | 2010120250 A | 6/2010 |
| JP | 05124633 B2 | 1/2013 |
| JP | 06152085 B2 | 6/2017 |
| JP | 2021518420 A | 8/2021 |
| JP | 2021520808 A | 8/2021 |
| JP | 2022527723 A | 6/2022 |
| JP | 7110382 B2 | 8/2022 |
| KR | 0116728 | 4/1998 |
| KR | 1020010016728 | 3/2001 |
| KR | 20170000033 A | 1/2017 |
| KR | 20210029710 A | 3/2021 |
| KR | 102338952 B1 | 12/2021 |
| KR | 20210149681 A | 12/2021 |
| SG | 104442 B | 5/2006 |
| SG | 102247 B | 2/2007 |
| SG | 104450 B | 4/2007 |
| SG | 109907 B | 5/2007 |
| SG | 109906 B | 6/2007 |
| SG | 112660 B | 9/2007 |
| SG | 146704 A1 | 11/2008 |
| SG | 11202010056R A | 11/2020 |
| WO | 9630274 A1 | 10/1996 |
| WO | 1998054568 A1 | 12/1998 |
| WO | 2003006899 A1 | 1/2003 |
| WO | 2003037082 A1 | 5/2003 |
| WO | 2005084372 A2 | 9/2005 |
| WO | 2006101237 A1 | 9/2006 |
| WO | 2008136720 A1 | 11/2008 |
| WO | 2009086829 A2 | 7/2009 |
| WO | 2010008396 A2 | 1/2010 |
| WO | 2012177250 A1 | 12/2012 |
| WO | 2013072348 A1 | 5/2013 |
| WO | 2013105966 A1 | 7/2013 |
| WO | 2015084388 A1 | 6/2015 |
| WO | 2016078800 A1 | 5/2016 |
| WO | 2016091629 A1 | 6/2016 |
| WO | 2017063623 A1 | 4/2017 |
| WO | 2017082895 A1 | 5/2017 |
| WO | 2017156240 A1 | 9/2017 |
| WO | 2018010826 A1 | 1/2018 |
| WO | 2018117949 A1 | 6/2018 |
| WO | 2019099406 A1 | 5/2019 |
| WO | 2019190535 A1 | 10/2019 |
| WO | 2019200145 A1 | 10/2019 |
| WO | 2019209268 A1 | 10/2019 |
| WO | 2020072810 A1 | 4/2020 |
| WO | 2020102390 A1 | 5/2020 |
| WO | 2020209892 A1 | 10/2020 |
| WO | 2021050484 A1 | 3/2021 |
| WO | 2022240009 A1 | 11/2022 |

OTHER PUBLICATIONS

Basic Science Concepts and Applicants, at p. 312; ISBN 9781583212332, 1583212337 (published 2003) (Year: 2003).

English translation of KR 2017000003 (Year: 2017).

"How it's made: Silicone Hoses manufacturing by Viper Performance" (Viperperformanceuk) Oct. 1, 2014, Available Online at <https://www.youtube.com/watch?v=iuO0TdzHnWo> 5:30-6:30, 1 page.

(56) References Cited

OTHER PUBLICATIONS

"Saint-Gobain Biopharm C-Flex EZ Top container closures", Available Online at <http://www.biopharm.saint-gobain.com/en/products.asp?id=66>, Oct. 15, 2013.
Disposable Polyethylene Vent Cap, Corning Life Sciences Catalot, http://catalog2.corning.com/LifeSciences/en-US/Shopping/ProductsDetails.a--spx?pid . . . , known at least as early as Mar. 18, 2014, 2 pages.
GE Healthcare Life Sciences, "Disposable Cellbag bioreactors for WAVE Bioreactor systems", Data file 28-9511-36 AF, Sweden, Jun. 2012, pp. 1-12.
Injection-Molded Silicone Stoppers Platinum Cured, AdvantaPure, known at least as early as Jun. 6, 2011, 2 pages.
Omnifit Solvent Safety Bottle Caps, Bio Chem Fluidics, known at least as early as Jun. 6, 2011, 16 pages.
PTFE Faced Silicone Septa for GL25 Open Top PBT Screw Cap, Corning Life Sciences Catalog, https://catalog2.corning.com/LifeSciences/en-US/Shopping/ProductDetails.a-- spx?category . . . , known at least as early as Mar. 18, 2014, 1 page.
Sani-Tech EZ Top Container Closure, Saint-Gobain Performance Plastics, known at least as early as Jun. 6, 2011, 2 pages.
Screenshots of Lucky Penny Shop video; publically available video, published Aug. 5, 2014, titled "Bunch O Balloons Review 100 water balloons in less than a minute!—Water Balloon Fight!", web address: https://youtube.com/watch?v=S1DaXYT6024 (Year: 2014).
Custom Biogenic Systems (Now Part of Biolife), Photo of aluminum box with hinged lid and closure from Custom Biogenic Systems, A Sartorius Celsius-Pak 100mL bag assembly is shown inside for reference, received from client in dislosure report; known at least as early as Jul. 28, 2021.
Thermofisher Scientific, Mr. Frosty Freezing Container, https://www.thermofisher.com/order/catalog/product/5100-0001, available as early as Jul. 28, 2021, accessed using the Wayback Machine Internet Archieves Sep. 8, 2022, 2 pages.
Planer, Cryogenic Freezers, https://planer.com/products/cryo-freezers.html, available as early as Jul. 28, 2021, accessed using the Wayback Machine Internet Archives Sep. 8, 2022, 5 pages.
Cryometrix (Part of Reflect Scientific), Cryometrix B-90 Blast/Tha Freezer, available as early as Jul. 28, 2021, accessed using the Wayback Machine Internet Archives Sep. 8, 2022, 5 pages.
Cytiva, Via Freeze Controlled-Rate Freezers, https://www.cytivalifesciences.com/en/us/shop/cell-therapy/systems/via-freeze-controlled-rate-freezers-p-09721, available as early as Jul. 28, 2021, accessed using the Wayback Machine Internet Archives Sep. 9, 2022, 4 pages.
Advanced Cooling Technologies, Variable Conductance Heat Pipes, https://www.1-act.com/products/variable-conductance-heat-pipes/, retrieved Jan. 25, 2021, accessed using the Wayback Machine Internet Archives Sep. 9, 2022. 6 pages.
Beyne, W. et al, Experimental investigation of solidification in metal foam enhanced phase change material, Oct. 2017, In IOP Conference Series: Materials Science and Engineering (vol. 251, No. 1, p. 012112), IOP Publishing.
Boyd Corporation, Cryogenic Heat Pipes, https://www.boydcorp.com/thermal/two-phase-cooling/cryogenic-heat-pipes.html, retrieved Jan. 27, 2021, accessed using the Wayback Machine Internet Archives Sep. 9, 2022, 7 pages.
Conde, M.R., Properties of aqueous solutions of lithium and calcium chlorides: formulations for use in air conditioning equipment design, International Journal of Thermal Sciences, 2004, vol. 43(4), pp. 367-382.
Cong, L. et al, Formulation and Characterisation of Ternary Salt Based Solutions as Phase Change Materials for Cold Chain Applications, Energy Procedia, 2019, vol. 158, pp. 5103-5108.
Feng, S. et al, Unidirectional freezing of phase change materials saturated in open-cell metal foams, Applied Thermal Engineering, 2015, vol. 88, pp. 315-321.
Heidemann, R. et al, A new seed-train expansion method for recombinant mammalian cell lines, Cytotechnology, 2002, vol. 38(1), pp. 99-108.
Jani, A. et al, Phase behavior of aqueous solutions of ethaline deep eutectic solvent, Journal of Molecular Liquids, 2020, vol. 304, 112701, 6 pages.
Khan, M. I. H., Conventional refrigeration systems using phase change material: A review, International Journal of Air-Conditioning and Refrigeration, 2016, vol. 24(03), p. 1630007-1-1630007-16.
Kumar, V. et al, Energy saving using phase change material in refrigerating system. In Third International Conference on Manufacturing Excellence, 2016, pp. 184-190.
Law, R. et al, Experimental investigation into the feasibility of using a variable conductance heat pipe for controlled heat release from a phase-change material thermal store, Thermal Science and Engineering Progress, 2018, vol. 7, pp. 125-130.
Liu, M. et al, Development of a novel refrigeration system for refrigerated trucks incorporating phase change material, Applied Energy, 2012, vol. 92, pp. 336-342.
Melinder, Å., Thermophysical properties of aqueous solutions used as secondary working fluids (Doctoral dissertation, KTH), 2007, 144 pages.
Oró, E., et al. Review on phase change materials (PCMs) for cold thermal energy storage applications, Applied Energy, 2012, vol. 99, pp. 513-533.
Thiagarajan, N. A Novel Approach to Development of a Thermal Capacitor, Electronics Cooling, https://www.electronics-cooling.com/2017/02/novel-approach-development-thermal-capacitor/, available as early as Jul. 28, 2021, access using the Wayback Machine Internet Archives Sep. 9, 2022, 8 pages.
Pending U.S. Appl. No. 17/386,831, filed Jul. 28, 2021.
Pending PCT Patent Application No. PCT/IB2022/056939 filed Jul. 27, 2022.
U.S. Appl. No. 17/386,831, filed Jul. 28, 2021, Cutting et al.
PCT/IB2022/056939, Jul. 27, 2022, Cutting et al.
International Search Report, PCT App. No. PCT/IB2022056939, dated Nov. 8, 2022, 11 pages.
International Search Report, PCT App. No. PCT/IB2022056940, dated Nov. 8, 2022, 10 pages.
Oro, et al., "Improving thermal performance of freezers using phase change materials," (International Journal of Refrigeration, https://www.sciencedirect.com/science/article/abs/pii/S0140700712000059) Jun. 2012, pp. 984-991, vol. 35, Issue 4, Elsevier, Amsterdam, NL.
International Search Report, PCT App. No. PCT/IB2022/056939, dated Jan. 5, 2023, 22 pages.
International Search Report, PCT App. No. PCT/IB2022/056940, dated Jan. 5, 2023, 20 pages.
International Preliminary Report on Patentability for PCT/IB2022/056940 issued Jan. 18, 2024, 11 pages.
Oró, E. et al. "Improving thermal performance of freezers using phase change materials", International Journal of Refrigeration, vol. 35, No. 4, Jan. 8, 2012, pp. 984-991.
International Preliminary Report on Patentability for PCT/IB2022/056939, issued Jan. 18, 2024, 12 pages.
Office Action for U.S. Appl. No. 17/386,831 issued Jul. 29, 2024, 86 pages.

* cited by examiner

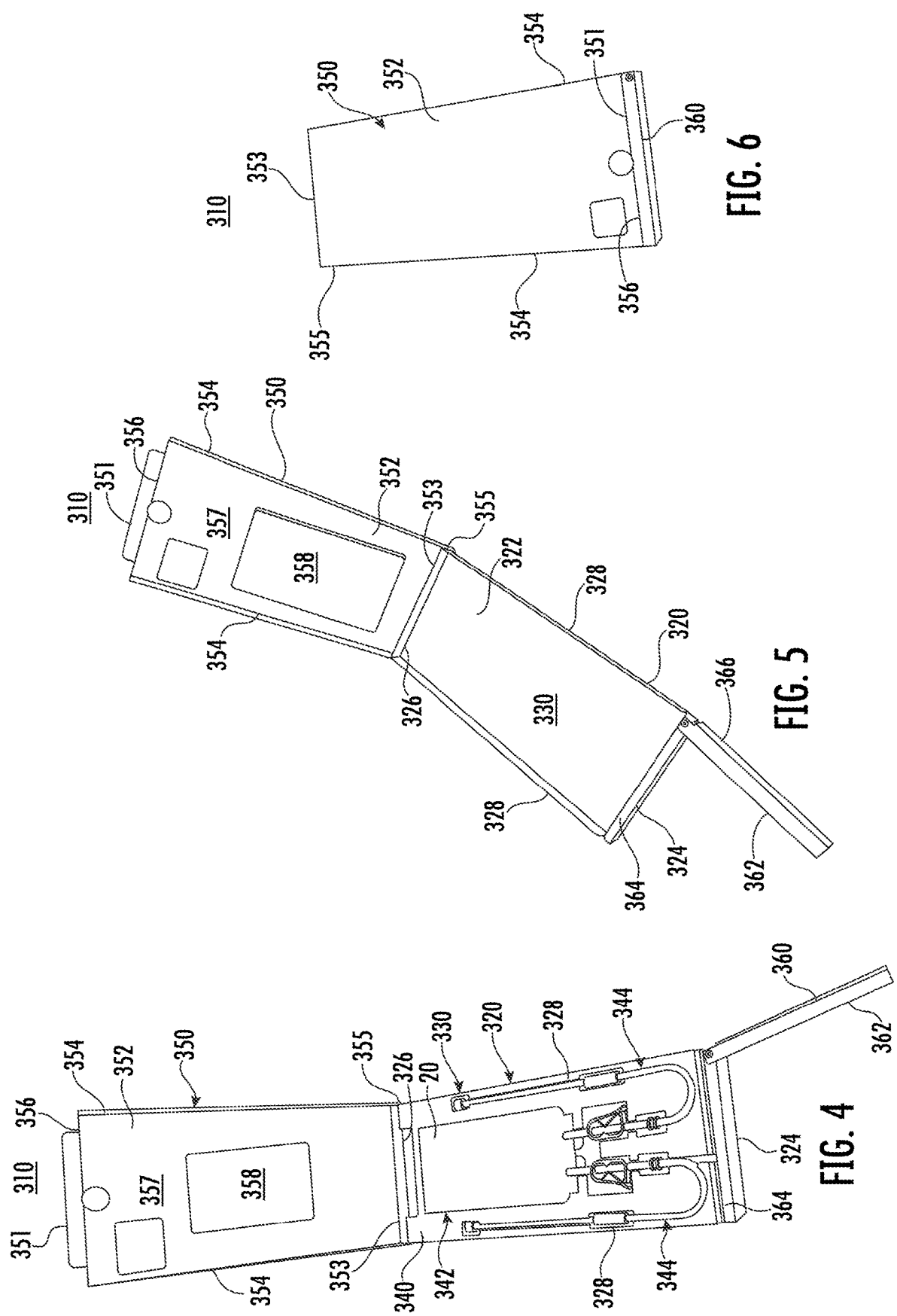

THERMAL CAPACITORS, SYSTEMS, AND METHODS FOR RAPID FREEZING OR HEATING OF BIOLOGICAL MATERIALS

BACKGROUND

1. Technical Field

The present disclosure relates to storage of biological materials and, more specifically, to systems and methods for rapid freezing of biological materials. The systems and methods may also be used for rapid heating or thawing of biological materials.

2. Discussion of Related Art

Frozen storage is a key step in production of biological materials including monoclonal antibodies, vaccines, cell banks, virus banks, and cell therapy products. By immobilizing the macromolecules, cells, or virus particles in a solid matrix, stability of the biological materials can be extended enabling more efficient manufacturing operations, global transport, and long-term availability.

There are several systems on the market for rapid freezing of monoclonal antibodies (mAbs) and similar therapeutic proteins, including process intermediates and formulated bulk drug substance (BDS). In some systems, open bottles and carboys can be replaced by stainless steel containers having internal heat exchange surfaces, e.g., CryoVessels (103 Liters (L) to 300 L). As single-use systems became more prevalent in the bioprocessing industry, single-use freeze/thaw systems such as the Sartorius Celsius® family of products allowing freezing of containers from 30 mL to 100 L which covers a wide range of batch sizes. The freezing temperature for monoclonal antibodies ranges from approximately −20 degrees Celsius (° C.) down to −80° C. and the duration of the freezing process can be anywhere from 4 hours to 24 hours with some freezing processes taking up to 48 hours, depending on freezer loading and the capabilities of the refrigeration plant. Long-term storage temperature is in the range of −20° C. to −40° C. and in some cases can even go as low as −80° C. Freezing temperature is typically chosen by a compromise between stability data, capex budget, container geometry, throughput requirements, and established practice.

Large biomanufacturing organizations are typically able to make the major capital investments in large scale specialty freezing equipment needed to reproducibly freeze large batches with high throughput. Smaller companies tend to have smaller batches and are not able to invest in high-end freezing equipment; they typically settle for lower throughput and may even prefer to use bottles or carboys, optionally adding closures such as Sartorius MYCAP® to enable aseptic processing.

Although mAbs and most macromolecules can be adequately stabilized in the temperature range −20° C. down to −80° C. and are often robust against relatively slow freezing times, living cells have much more challenging requirements. An initial freezing step to −60° C. or −80° C. is suitable for some cell lines when the storage duration is short. However, for long term storage of cells the storage temperature must be much lower than −80° C. in order to fully immobilize the cells. The storage temperature for cells is typically selected to be below the glass transition temperature of water at −137° C. and may be as low as the boiling point of liquid nitrogen at −196° C. In addition, the freezing process must happen relatively quickly to prevent growing ice crystals from damaging the structure of the cell. The commonly used target is to freeze at 1° C. per minute. It is important to note that cooling too quickly can be detrimental to cell viability. As an example, to cool from 5° C. to −80° C. the duration should be approximately 85 minutes. When container sizes are small, e.g., 2 mL to 100 mL, conventional lab freezers may be capable of handling small batch sizes. However, as the batch size increase and/or the container sizes increase, e.g., 1 L to 20 L and beyond, conventional freezers are not capable of meeting the freeze rate target of 1° C. per minute such that specialized high-end freezing equipment is required.

The use of polymeric single-use containers (bags, bottles, tubing, and components such as connectors) at temperatures in the range −20° C. to −80° C. is already a significant challenge requiring careful attention to material selection and packaging. Some of the best available materials are silicone (especially phenyl-based silicones) and polyolefins (e.g. EVA, LLDPE), but even these will start to become leathery as the temperature passes below approximately −80° C. and brittle as the temperature passes below approximately −120° C. For applications requiring compatibility with storage/transport at −196° C., the packaging becomes a much greater challenge. Fluoropolymers such as PTFE, polyimide, FEP, PFA, ETFE, etc. are known to have a high degree of robustness in cryogenic temperatures but suffer from additional problems including cost, processing constraints, and in many cases poor resistance to sterilization by gamma irradiation. There is therefore a need for containers which provide excellent packaging without introducing significant thermal resistances which could slow heat transfer.

In the case of cell banks and similar applications, the biological material to be frozen is generated by growing high density cell culture in a small perfusion reactor (perhaps 20 L working volume), introducing a mixture of fresh media with cryoprotectant such as DMSO, and then quickly filling and freezing in a time window of 1-2 h. This creates a significant ergonomic challenge because approximately 200×-250×100 mL bags must be accurately filled to a target volume and then rapidly frozen without the chance to stage the activity in multiple batches. Further complicating matters, the activity is likely to happen in a lab setting with very limited space and should ideally only require 1-2 operators.

In view of the foregoing, there is a need for systems and methods for rapidly freezing biological materials without the need for specialized high-end freezing equipment. In addition, there is a need for systems and methods to simplify handling of large batches of containers of biological materials for freezing.

SUMMARY

This disclosure includes systems and methods to achieve rapid freezing in traditional laboratory freezing equipment without the use of specialized high-end refrigeration equipment. In addition, this disclosure includes systems and methods for simplifying handling of large batches of containers of biological material for freezing. While the systems and methods detailed herein are described with respect to rapid freezing of biological materials, the systems and methods may also be used for thawing and heating biological materials.

In an embodiment of the present disclosure, a thermal capacitor includes a shell and a phase-change material (PCM). The shell includes a first major surface that is configured to contact a container including media to be frozen and defines a cavity. The PCM is disposed within the cavity and has a transition temperature in a range of −80° C. to −50° C. The thermal capacitor is configured to rapidly freeze media from room temperature to at least −50° C. with the container including the media in contact with the shell in an enclosed space.

In embodiments, the first major surface is formed of a material to enhance thermal energy transfer into or out of the PCM. The shell may include a second major surface that is opposite the first major surface. The second major surface may be configured to contact another container including media to be frozen and may be formed of a material to enhance thermal energy transfer into or out of the PCM.

In some embodiments, the PCM is disposed within a package that is positioned within the cavity. The PCM may have a transition temperature in a range of −72° C. to −67° C. The thermal capacitor may be configured to freeze media at a cooling rate of 1° C. to 4° C. per minute.

In certain embodiments, the thermal capacitor includes a charge indicator that is positioned on the shell. The charge indicator may provide a charge state of the PCM. The thermal capacitor may include a sensor for determining a charge state of the PCM. The sensor may be in communication with the charge indicator. The sensor may be a resistance temperature detector, a thermocouple, a thermistor, an ultrasonic sensor, or an optical sensor.

In another embodiment of the present disclosure, a rapid freezing system includes a ULT Freezer and a thermal capacitor. The ULT Freezer defines an interior to receive media. The ULT Freezer is capable of maintaining media within the interior at a temperature of less than −50° C. The thermal capacitor is disposed within the interior of the ULT Freezer and includes a shell and a phase-change material (PCM). The shell includes a first major surface that is configured to contact a container including media to be frozen and defines a cavity. The PCM is disposed within the cavity. The PCM has a transition temperature in a range of −80° C. to −50° C. the thermal capacitor is configured to rapidly freeze media from room temperature to at least −50° C. with the container including the media in contact with the first major surface of the shell.

In embodiments, the thermal capacitor is capable of rapidly freezing media without additional refrigeration power from the ULT Freezer. The ULT Freezer may trickle charge the thermal capacitor between freezing processes. The interior of the ULT Freezer may maintain a temperature below −50° C. during freezing of 5 liters or more of media.

In another embodiment of the present disclosure, a rapid freezing system includes a frame and a plurality of thermal capacitors. Each thermal capacitor is mounted within the frame such that media to be frozen is receivable between adjacent thermal capacitors. Each thermal capacitor includes a shell and a phase-change material (PCM) disposed within the cavity. The PCM has a transition temperature in a range of −80° C. to −50° C.

In embodiments, each thermal capacitor includes a contact surface that is configured to contact a container including media to be frozen. The contact surface may be formed of a material to enhance thermal energy transfer into or out of the PCM. The shell may be formed of aluminum and may include walls defining the cavity. The walls defining the cavity may be anodized or nickel plated. The PCM may be sealed within a package that is disposed within the cavity. The package may be formed of fluoropolymers or a silicone rubber.

In some embodiments, at least one of the thermal capacitors include a sensor assembly. The sensor assembly may provide indicia of a charge state of the PCM within the at least one thermal capacitor. The sensor assembly may include a sensor that is selected from the group consisting of a resistance temperature detector, a thermocouple, a thermistor, an optical sensor, or an ultrasonic sensor.

In certain embodiments, the frame includes an upper rail and a lower rail. The plurality of thermal capacitors may be slidably mounted on the upper rail and the lower rail.

In particular embodiment, the system includes a ULT Freezer with the frame being disposed within the ULT Freezer. The plurality of thermal capacitors may be configured to increase a quantity of media capable of being frozen by the ULT Freezer without the ULT Freezer deviating above a maximum temperature. The ULT Freezer with the frame may be capable of freezing 5 liters or more of media without significant deviation from a set point temperature. The maximum temperature or set point temperature of the ULT Freezer may be −50° C., −60° C., −65° C., −70° C., −75° C., or −80° C.

In certain embodiments, the thermal capacitors are fixed within the rack such that a channel is defined between adjacent thermal capacitors. The rapid freezing system includes a carrier holder for insertion into the channel between adjacent thermal capacitors. The carrier holder may have a first side and a second side that are each configured to receive a container including media to be frozen. The carrier holder may have a compressed configuration in which the carrier holder has a first thickness and an uncompressed configuration in which the carrier holder has a second thickness that is greater than the first thickness. The first side and the second side may be moveable relative to one another between the compressed configuration and the uncompressed configuration. In the compressed configuration, the boxes are spaced apart from the thermal capacitors and in the uncompressed configuration at least one surface of the containers are in contact with a respective thermal capacitor. The first thickness may be less than a channel thickness of the channel and the second thickness may be greater than the channel thickness.

In some embodiments, the carrier holder includes a biasing member that is disposed between the first side and the second side. The biasing member may urge the first side and the second side away from one another such that the carrier holder is urged towards the uncompressed configuration. Each thermal capacitor may include a groove and a cutout that is aligned with and positioned at each end of the groove. The carrier holder may include a first boss that extends from the first side and a second boss that extends from the second side. The first boss and the second boss may be slidably received in the groove and may be receivable in the cutout. The carrier holder in the compressed configuration when the first boss and the second boss are received within the groove and is between the compressed configuration and the uncompressed configuration when the first boss and the second boss are disposed in the notches.

In another embodiment of the present disclosure, a method of rapidly freezing media includes charging a plurality of thermal capacitors disposed in a ULT Freezer with each of the thermal capacitors including a PCM that has a transition temperature in a range of −80° C. to −50° C. The method also includes placing a plurality of containers including media to be frozen within the ULT Freezer with each of the plurality of containers in direct contact with one of the plurality of thermal capacitors. The method further includes each of the thermal capacitors in contact with a respective container to provide freezing power directly to the container including the media to rapidly freeze media within the respective container from room temperature to −50° C. such that an interior of the ULT Freezer remains below −50° C. during freezing of the media.

In embodiments, the maximum temperature of the ULT Freezer is −50° C. during freezing of at least 5 liters of media. Placing the plurality of container includes media to be frozen may include a total amount of media being at least 5 liters.

In some embodiments, placing the plurality of containers including media to be frozen within the ULT Freezer includes placing each box of a plurality of boxes in contact with at least one of the plurality of thermal capacitors. The method may include inserting each vessel of the plurality of vessels into a box. The method may include inserting a plurality of boxes into a carrier holder and inserting the carrier holder into a channel defined between adjacent thermal capacitors. Inserting the carrier holder may include the carrier holder being in a compressed configuration during insertion in which the boxes are spaced apart from the thermal capacitors and when fully inserted the carrier holder expands towards and uncompressed configuration in which each box is in direct contact with one of the thermal capacitors. During insertion, bosses of the carrier holders may slide within grooves of the thermal capacitors. Interaction of the bosses with grooves urging the carrier holder towards the compressed configuration. The bosses may be received within notches when the carrier holder is fully inserted such that the carrier holder expands towards the uncompressed configuration. Placing the plurality of containers may include the media to be frozen to be high cell density culture.

In another embodiment of the present disclosure, a carrier for receiving a vessel includes a body that defines a well. The well is sized and dimensioned to receive a vessel including media. The body is configured to urge the vessel received in the well towards an external wall of the body to enhance thermal energy transfer into or out of the media within the vessel.

In embodiments, the well is sized and dimensioned to compensate for expansion of media within the vessel as the temperature of media within the vessel changes.

In some embodiments, the body is configured to be received in a box. The carrier may include a transfer element that defines one side of the well. The transfer element may be configured to be in intimate contact with the external wall of the box and the vessel to enhance thermal energy transfer into or out of media within the vessel. The transfer element may be formed of aluminum.

In certain embodiments, the carrier includes a hook for supporting the body during filling of a vessel received within the body with media. The hook may be removeably secured to the body.

In another embodiment of the present disclosure, a box assembly for supporting media during thermal changes includes a box, a vessel, and a carrier. The box has a fixed wall assembly and a closure. The fixed wall assembly defines a chamber. The box has an open configuration in which the chamber is accessible and a closed configuration in which the closure prevents access to the chamber. The fixed wall assembly has a thermal transfer wall opposite the closure when the box is in the closed configuration. The vessel is configured to aseptically hold media during rapid temperature change of the media. The carrier is sized and dimensioned to be disposed within the chamber of the box. The carrier has a body that defines a wall. The vessel is received within the wall and the carrier urges the vessel towards the thermal transfer wall of the fixed wall assembly.

In embodiments, the carrier includes a thermal transfer element that forms a boundary of the well. The carrier urges the vessel into contact with the thermal transfer element.

In another embodiment of the present disclosure, a fluid distribution system includes a fluid distribution hub, a frame, a plurality of carriers, and a plurality of vessels. The fluid distribution hub has a single inlet and a plurality of outlets. The frame supports the fluid distribution hub and includes an upper support. The plurality of carriers are supported about the fluid distribution hub on the upper support. The plurality of vessels are each disposed within a respective one of the carriers. Each vessel is in fluid communication with the fluid distribution hub by an inlet tube that extends from a respective outlet of the plurality of outlets. Each of the vessels aseptically separable from the fluid distribution hub with each vessel remaining within the respective carrier after separation.

In embodiments, each inlet tube includes an aseptic seal element. The aseptic seal element severable such that the inlet tube is aseptically sealed.

In some embodiments, the fluid distribution system includes a plurality of hooks with each hook associated with and extending from a respective carrier and engaged with the upper support to hang the respective carrier from the upper support.

In certain embodiments, the frame includes a lower support with each of the carriers supported about the fluid distribution hub by the lower support and the upper support. Each carrier may include a notch defined therein that receives a portion of the lower support to position carrier relative to the lower support. The interaction between each of the plurality of carriers and the upper support and the lower support limit degrees of freedom of the carriers relative to the fluid distribution hub to fix the carriers relative to the distribution hub.

In another embodiment of the present disclosure, a method of rapidly freezing media includes simultaneously distributing media from a primary vessel to a plurality of secondary vessels, aseptically disconnecting each secondary vessel from the fluid distribution system, removing each carrier, and rapidly freezing media within the secondary vessels. Each of the secondary vessels received in a carrier supported about a fluid distribution hub. Removing each carrier includes a respective secondary vessel being received within the carrier. The method may include securing each carrier with a respective secondary vessel in a respective box.

In embodiments, securing each carrier includes the carrier or the box urging the secondary vessel into contact with a thermal transfer wall of the box. Securing each carrier may include a pad on a closure of the box engaging the secondary vessel to urge the secondary vessel towards the thermal transfer wall of the box.

In some embodiments, securing each carrier includes a thermal transfer element of the carrier being in intimate contact with the thermal transfer wall of the box. Aseptically disconnecting each secondary vessel includes aseptically disconnecting an input tube of the secondary vessel from the fluid distribution system and positioning the input tube in a channel of the carrier. Aseptically disconnecting the input tube may include severing the input tube.

In particular embodiments, removing each carrier includes lifting the carrier such that a hook associated with the carrier is removed from an upper support of the fluid distribution system. Removing each carrier includes detaching the hook from the carrier before securing each carrier in the respective box. Lifting the carrier may include removing a lower support of the fluid distribution system from within a notch of the carrier such that a lower portion of the carrier is free to move relative to the fluid distribution system. Simultaneously distributing media from the primary vessel may include the media being a high cell density culture.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are incorporated in and constitute a part of this specification, wherein:

FIG. 4 is a front perspective view of the box and a carrier provided in accordance with an embodiment of the present disclosure with the box in an open configuration;

FIG. 5 is a front, side perspective view of the box of FIG. 4 in an open configuration;

FIG. 6 is a front perspective view of the box of FIG. 5 in a closed configuration;

DETAILED DESCRIPTION

Figure 1:
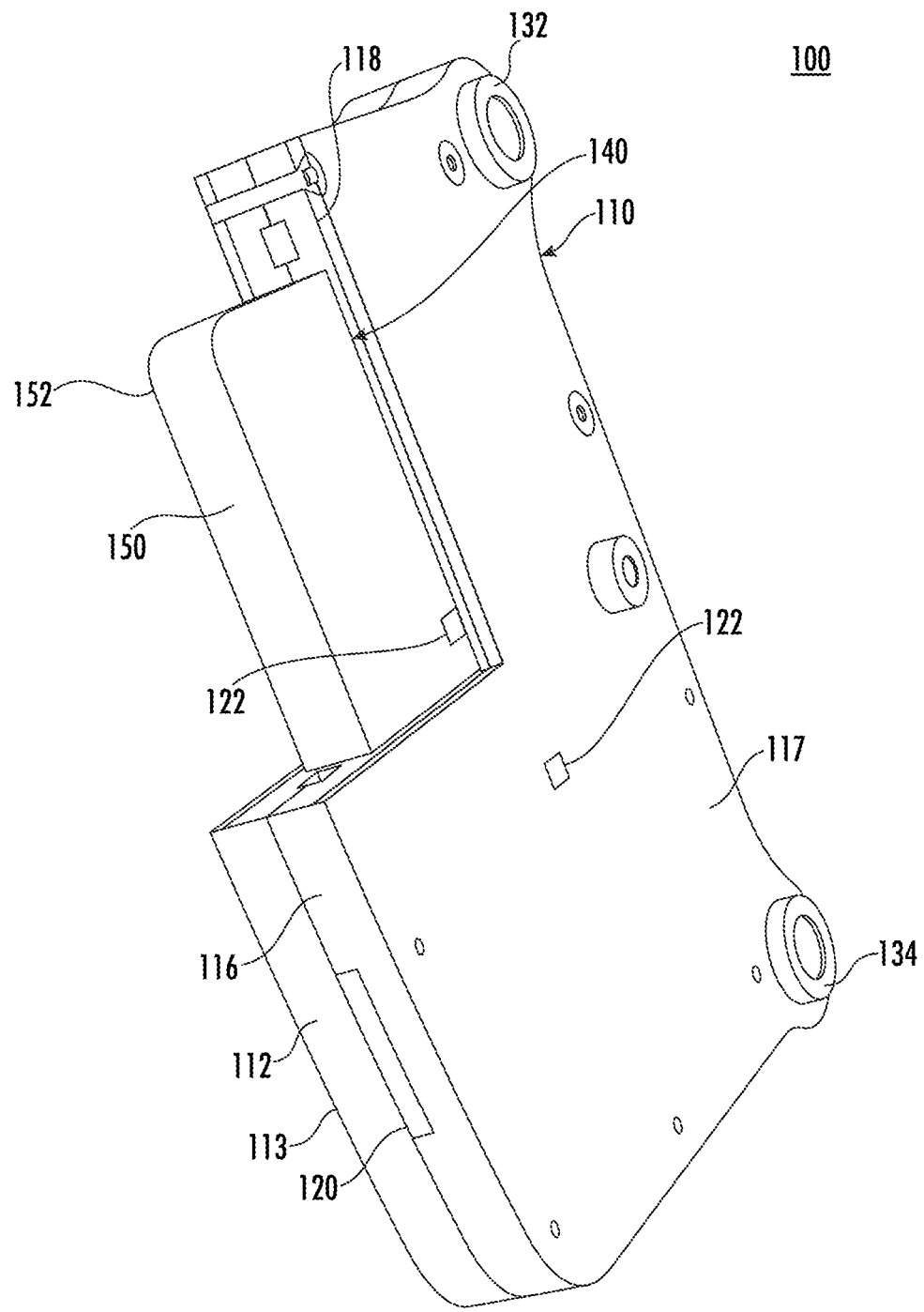
FIG. 1 is a perspective view of a thermal capacitor provided in accordance with an embodiment of the present disclosure with a portion of the thermal capacitor cutaway.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

As used herein, the terms "biological material", "material", and "media" may be used synonymously and may refer to any biological material, media, or product including, but not limited to, monoclonal antibodies, vaccines, cell banks, high density cell cultures, virus banks, and cell therapy products in the form of macromolecules, cells, or virus particles. While high density cell cultures may be described as media herein, when specified, high density cell cultures are cell cultures having more than 50 million cells per milliliter (mL). In some embodiments, high density cell cultures may have more than 100 million, 120 million, or 150 million cells per mL. Exemplary cell cultures are disclosed in International Patent Publication WO2021052857, the entire contents of which are hereby incorporated by reference. In addition, as used herein, "cooling power" or "refrigeration power" refers to the ability to remove heat energy from material such that a temperature of the material is reduced. Further, as used herein, the term "container" refers to any object that is configured to hold media disposed therein and may describe a vessel that holds media therein or may describe a box or other object that holds a vessel with media disposed therein.

Typical ultra-low temperature laboratory freezers or −80° C. freezers are generally cooled by 2-stage refrigeration plants and may have set points between −86° C. and −50° C. that can be referred to generally as "ULT Freezers." These ULT Freezers are ubiquitous in the laboratory environment and are commercially available from a variety of manufacturers including Thermo Scientific, Panasonic, and Sanyo. While ULT Freezers are intended to keep frozen material frozen but are not designed with adequate refrigeration power to freeze large amounts of liquid placed therein. In fact, Thermo Scientific rates an open door recovery time of a STP series of ULT Freezers in a range of 11-24 minutes without freezing liquids added. As such, while it may be possible to place 1 L of material to freeze in a ULT Freezer, e.g., 500×2 mL vials, as an amount of material and/or the size of the containers increase, e.g., 50×100 mL bags equating to a total of 5 L of material, an ULT Freezers is likely to show large excursions away from the set temperature as the material is frozen. These large deviations can jeopardize other material in the ULT Freezer and may not allow the material placed in the ULT Freezer to freeze at a desired rate, e.g., 1° C. per minute.

This disclosure generally relates to systems, methods, and apparatus to rapidly and reliably freeze large volumes of material, e.g., 50×100 mL bags equating to a total of 5 L of material, in a ULT Freezer without causing undesirable temperature excursions from a set point temperature. Such systems, methods, and apparatus may allow both large and small facilities to process material, e.g., rapidly freeze, without making large capital investments in specialty freezing equipment. Such systems, methods, and apparatus may allow for rapid freezing without the costs and safety concerns of handling cryogens, e.g., liquid nitrogen or dry ice.

In a typical lab or production environment, a freezing operation is not a continuous process. For example, a lab or production facility may have a limited number of batches each week that require freezing. As detailed below, it may be possible to include a thermal energy storage device ("thermal battery" or "thermal capacitor") in a ULT Freezer that is slowly charged ("trickle charged") between freezing operations and rapidly discharged during a freezing operation. Such a thermal capacitor may include a phase-change material (PCM) with a melting point in a range near a minimum operating temperature of the ULT Freezer but much colder than a freezing point of the material to be frozen which is typically near 0° C. The maximum operating temperature of a ULT Freezer may be in a range of −50° C. to −75° C. A thermal capacitor with a PCM may be capable of providing a pulse of refrigeration power to be frozen to prevent deviations in a temperature within the ULT Freezer. The thermal capacitor may be left in the ULT Freezer to charge when the ULT Freezer is not being used in a freezing process, sit idle once charged, and then discharge when material to be frozen is placed in the ULT Freezer. It may be beneficial to include PCMs in various locations along walls defining an interior of the ULT Freezer or even in a refrigeration plant of the ULT Freezer, however, placing the PCM or thermal capacitor closer to the material to be frozen may provide increased refrigeration power.

Referring now to FIG. 1, a thermal capacitor is disclosed in accordance with an embodiment of the present disclosure and is referred to generally as capacitor 100. The capacitor 100 includes a shell 110 that retains a PCM 150 therein to prevent the PCM 150 from leaking or evaporating from a cavity 140 defined within the shell 110. The cavity 140 may be an enclosed compartment such that the PCM 150 is encapsulated or sealed within the cavity 140. In some embodiments, the cavity 140 is an open cavity and the shell 110 retains the PCM 150 within the cavity. The shell 110 is formed of a thermally conductive material to conduct heat into and out of the PCM 150. The material forming the shell 110 must also be capable of withstanding compressive forces involved in contacting containers to be frozen, as detailed below, and to withstand internal pressures within the cavity 140 generated by density changes within the PCM 150 as the PCM 150 changes temperature. In embodiments, the shell 110 is formed of a thermally conductive metal that is resistant to corrosion. In particular embodiments, the shell 110 is formed of aluminum. Aluminum may be advantageous for its high thermal conductivity and its relatively low cost. In addition, aluminum may be advantageous as a result of its low density such that the shell 110 may have a low weight compared to shells formed of other thermally conductive materials. Aluminum may also be resistant to corrosive materials and may be anodized or nickel plated to increase resistance to corrosion.

The shell 110 may be formed of a first half shell 112 and a second half shell 116 that are each formed from a solid block with the cavity 140 being machined out of the solid block. The first half shell 112 and the second half shell 116 may be joined together with fasteners, be brazed together, or be welded together, e.g., laser welded, with a gasket or sealant disposed along opposed faces thereof to seal the cavity 140. The surfaces of the first half shell 112 and the second half shell 116 defining the cavity 140 may be treated to provide or enhance resistance to corrosion. For example, the surfaces defining the cavity 140 may be anodized or nickel plated to provide or enhance resistance to corrosion.

In some embodiments, the shell 110 may include features to enhance the structure of the shell 110 to reinforce or strengthen the shell 100 as the PCM 150 changes phase. For example, the shell 110 may include ribs and/or fillets to strengthen the shell 110. The ribs or fillets may be positioned at a variety of locations within the shell 110 and may extend vertically, horizontally, or diagonally through the shell or the cavity 140.

The shell 110 includes a contact surface which is a major surface of one of the half shells that is designed to contact a product container to be frozen. For example, the shell 110 may include a first contact surface 113 which is a major surface of the first half shell 112 and a second contact surface 117 which is a major surface of the second half shell 116. The first contact surface 113 and the second contact surface 117 are opposite one another such that the first contact surface 113 is capable of contacting a first container and a second contact surface 117 is capable of contacting a second container.

The PCM 150 may be disposed within the cavity 140 such that the PCM 150 is in direct contact with the surfaces defining the cavity 140. In some embodiments, the PCM 150 is sealed within a package 152 that is disposed within the cavity 140. The package 152 may be a sealed bag that is dimensioned to be disposed within the cavity 140 without wrinkles and voids. In some embodiments, the package 152 is formed of fluoropolymers or a silicone rubber that is capable of withstanding the temperatures within the cavity 140, e.g., −80° C. When the package 152 is formed of fluoropolymers, the fluoropolymers may include, but not be limited to, PTFE, polyimide, FEP, PFA, ETFE.

The PCM 150 has a phase change point in a range of −50° C. to −75° C. For example, the PCM 150 may have a melting point in a range of −50° C. to −75° C. The PCM 150 may be a eutectic solution in water such as calcium chloride with a melting point of −50° C., potassium acetate with a melting point of −62° C., lithium chloride with a melting point of −70° C., or a mixture of lithium chloride and lithium bromide. The melting points of these eutectic solutions may be tuned by creating ternary aqueous solutions of deep eutectic solvents such as ethaline which is a mixture of ethylene glycol and choline chloride. In some embodiments, a freezing point or transition temperature of a eutectic solution of lithium chloride and lithium bromide can be tuned by adjusting the ratio of lithium chloride to lithium bromide in the eutectic solution. The PCM 150 may be selected for other properties such as being non-flammable, non-hazardous, readily available, and having adequate energy storage density. In certain embodiments, the PCM 150 may have a freeze temperature in a range of −80° C. to −65° C. (e.g., −72° C.), a melt temperature in a range of −70° C. to −64° C. (e.g., −67° C.), a latent heat in a range of 200 kJ/kg to 230 kJ/kg (e.g., 200 kJ/kg), and a density in a range of 1.18 g/cm$^3$ to 1.38 g/cm$^3$ (e.g., 1.38 g/cm$^3$). The PCM 150 may include additives such as nucleating agents to prevent supercoiling, anti-corrosion agents, or gelling agents to prevent separation or formation of density gradients. The additives may enhance the properties of the PCM 150 to ensure repeatable behavior after many freeze cycles.

In some embodiments, the PCM 150 may be manufactured from plant feedstocks. Such a PCM 150 may be non-hazardous, non-corrosive, and/or cross-linked and may have a transition temperature of −60° C. Cross-linking of a PCM 150 may increase a viscosity of the material such that the PCM 150 may be a high-viscosity gel or solid material. A high-viscosity gel or solid material may reduce or prevent leaks from the cavity 140 even if the cavity 140 is compromised with the PCM 150 disposed therein. In some embodiments, the cavity 140 is an open cavity with the cross-linking of the PCM 150 retaining the PCM 150 within the cavity 140. As such, the cavity 140 may not be required to be sealed or the PCM 150 may not be required to be disposed within a package 152 which may reduce a cost of manufacturing the thermal capacitor 100. Additionally or alternatively, if such a PCM 150 is non-corrosive, walls defining the cavity 140 may remain uncoated which may reduce a cost of manufacturing the thermal capacitor 100. A PCM that is at least one of non-hazardous, non-corrosive, and/or cross-linked may reduce manufacturing costs and reduce safety concerns associated with other PCMs hazardous, corrosive, or non-cross-linked materials.

The amount of PCM 150 and thus, the size of the cavity 140 is selected to balance the refrigeration power to freeze the material and to reduce the charging time. As most biological materials can be modeled using the properties of water. For example, to freeze a 100 mL bag of material from 5° C. to −40° C. at a freeze rate of 1° C./minute using a eutectic solution of calcium chloride initially at 70° C. as the PCM 150 requires a transfer of 42 kilojoules (kJ) over 45 minutes or 16 Watts (W). Thus, the volume of calcium chloride required to deliver 42 kJ is 130 mL. The cavity 140 may be dimensioned to have the same foot print as the material to be frozen, e.g., the 100 mL, with a thickness determined by the amount of PCM 150 required. Continuing the current example, the cavity 140 having a foot print similar to a 100 mL bag would be 1.3 times as thick to hold 130 mL of calcium chloride. In some embodiments, the cavity 140 and/or a package 152 containing the PCM 150 may include void space to accommodate expansion of the PCM 150 as a phase of the PCM changes.

The thermal capacitor 100 may include a charge indicator 120 to indicate a "charge state" of the PCM 150 which can be considered a charge state of the thermal capacitor 100. The charge indicator 120 may be in signal communication with a sensor 122 configured to determine a temperature of the PCM 150. The sensor 122 may be a resistance temperature detector (RTD), a thermocouple, thermistor, or other sensor suitable for determining the temperature of the PCM 150. The sensor 122 may be located at key locations of the thermal capacitor 100. For example, the sensor 122 may be located within the cavity 140. For example, the sensor 122 may be positioned at the center of the cavity 140. The charge indicator 120 may include multiple sensors disposed about the thermal capacitor 100. The charge indicator 120 may include a sensor 122 on a contact surface, e.g., contact surface 113, to indicate a temperature of the contact surface 113 and thus, substantially the temperature of a media within the container in contact with the contact surface.

In some embodiments, the sensor 122 may include an ultrasonic sensor that operates in a transmit/receive mode or may be a pair of ultrasonic sensors with one in transmit mode and the other in receive mode. The ultrasonic sensor 122 may send an ultrasonic pulse through the PCM 150 to estimate the charge state, e.g., the extent of phase change, of the PCM 150 during charging or discharging of the PCM 150. When a single ultrasonic sensor 122 is used, the ultrasonic pulse may reflect off a far wall of the cavity 140. An ultrasonic sensor may be advantageous by allowing a measurement of the PCM 150 at the center of the cavity 140 by placing a sensor or sensors at the walls defining the cavity 140, e.g., without requiring a physical sensor to be disposed within the PCM 150.

In some embodiments, the sensor 122 may include an optical sensor. The optical sensor 122 may include a light source positioned on one side of the cavity 140 and a detector on the opposite side of the cavity 140. The light source directing light towards the detector with the detector detecting an amount of light received. The decrease in the number of photons arriving at the detector may be indicative of the charge state as a result of deformities generated during the freezing process, e.g., crystal boundaries and frozen bubbles, which can scatter light.

The charge indicator 120 may include a processor that receives electrical signals from the sensor or sensors 122 detailed above and provide an indication of a charge state of the PCM 150 at least in part by the electrical signals received from the sensors 122. The charge indicator 122 may also use other metrics to indicate a charge state of the PCM 150. The other metrics may include elapsed time. Communication between the charge indicator 120 and the sensors 122 may be wired or wireless. The charge indicator 120 may provide visual indicia of the charge state of the PCM 150. The visual indicia may be a light, e.g., green when charged or red when not charged. The visual indicia may be a gauge to show an amount of charge of the PCM 150.

Figure 3:
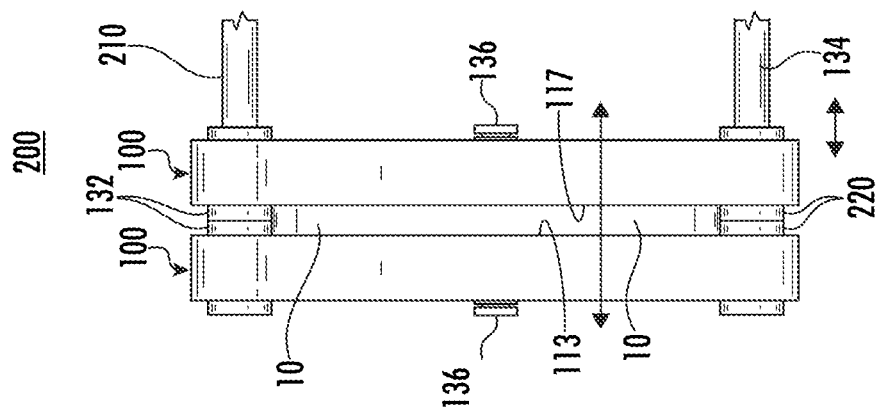
FIG. 3 is a front view of a portion of the rapid freezing system of FIG. 2 in a closed position about a box.
Figure 2:
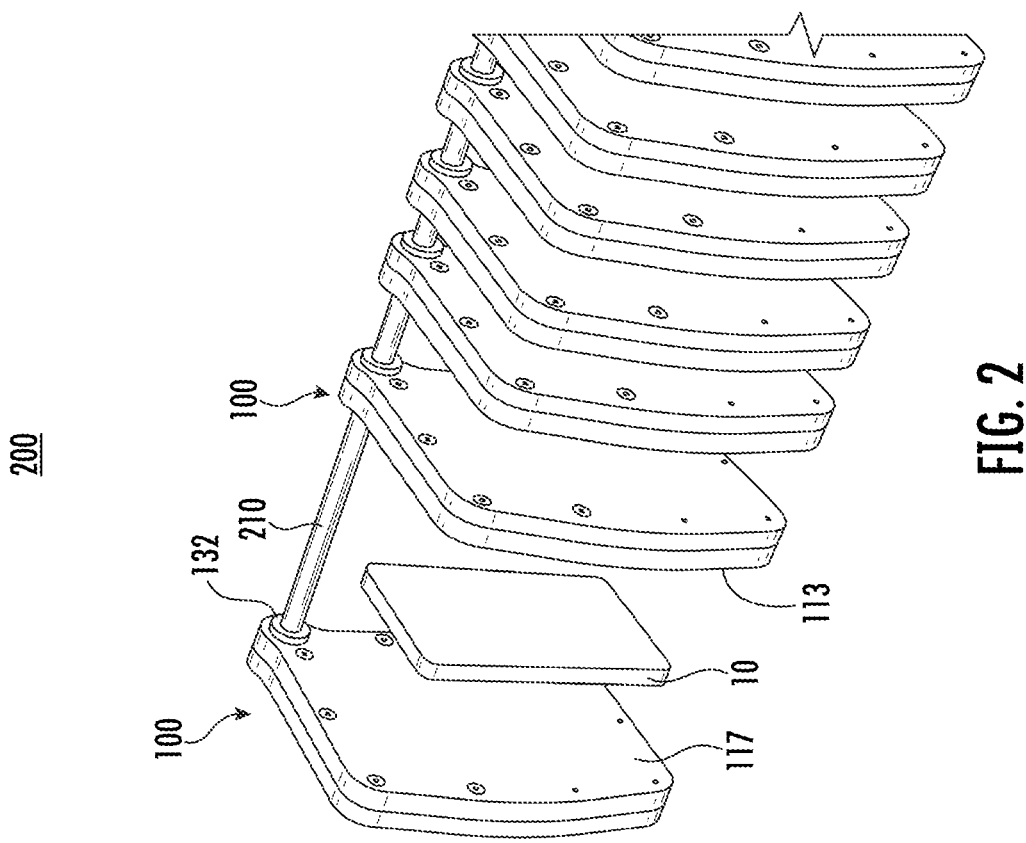
FIG. 2 is a perspective view of a rapid freezing system provided in accordance with an embodiment of the present disclosure with the rapid freezing system in an open position.

With additional reference to FIGS. 2 and 3, the thermal capacitor 100 may be part of a rapid freezing system 200 provided in accordance with an embodiment of the present disclosure. The rapid freezing system 200 includes several thermal capacitors 100 slidably mounted to a top rail 210 and a bottom rail 220. Each of the thermal capacitors 100 may include a top bearing or mount 132 and a bottom bearing or mount 134 that receives a respective one of the top rail 210 and bottom rail 220 therethrough to slidably mount the thermal capacitor 100 within the rapid freezing system 200. The mounts 132, 134 may be dimensioned to allow slide on the rails 210, 220 and be formed of a material that resists free movement along the rails 210, 220 such that the thermal capacitors 100 may maintain a position within the rapid freezing system 200 absent an external force.

In use, the container or box 10 including material to be frozen may be positioned between two thermal capacitors 100 in an open position relative to one another as shown in FIG. 2. In the open position, two thermal capacitors 100 are spaced apart from one another such that a box 10 can be positioned between the contact surfaces 113, 117 of the thermal capacitors 100. With the box 10 positioned between the contact surfaces 113, 117 of the thermal capacitors 100, one or both of the thermal capacitors 100 are slid towards the other thermal capacitor 100 to capture the box 10 between the thermal capacitors 100 such that the thermal capacitors 100 are in a closed position relative to one another as shown in FIG. 3. In the closed position, the box 10 is in intimate contact with a contact surface 113, 117 of each of the thermal capacitors 100. In the closed position, the mounts 132, 134 of the thermal capacitors 100 may be in contact with one another to define a space between the contact surfaces 113, 117 of the respective thermal capacitors 100. Each of the mounts 132, 134 may have a thickness substantially equal to half of a thickness of the box 10 such that the space is substantially equal to a thickness of the box 10. The thermal capacitors 100 may include carriers 136 positioned along the contact surfaces 113, 117 that have a thickness substantially equal to half of a thickness of the box 10 and positioned to contact a carrier 136 extending from an opposing contact surface 113, 117. The thermal capacitors 100 may include a carrier 136 positioned below the box 10 when the thermal capacitors 100 are in a closed position. The carriers 136 below the box 10 may support the box 10 thereon.

Bringing the box 10 into intimate contact with the contact surfaces 113, 117 of the thermal capacitors 100 facilitates the rapid freezing of material within the box 10. Bringing the material to be frozen into the immediate vicinity of the thermal capacitors 100 may improve heat transfer out of the material to be frozen.

While rapid freezing is desirable, freezing at too high or quick of a rate may be detrimental to some materials. Bringing a box, e.g., box 10, into intimate contact with thermal capacitors 100 having sufficient PCM 150 to freeze material within the box 10 to a desired temperature may result in the cooling rate of the material being excessive or too high. To control the cooling rate, the thermal capacitors 100 may include an insulation layer 118 between the PCM 150 and the contact surfaces 113, 117 to limit or tune the cooling rate. To tune the cooling rate, the thickness of the insulation layer 118 is increased to decrease the cooling rate and a thickness of the insulation layer 118 is decreased to increase the cooling rate.

An internal resistance of the PCM 150 may also affect a cooling rate. Specifically, an internal resistance of the PCM 150 may create a bottle neck in a flow of thermal energy into and out of the PCM 150. Some PCMs may have low thermal conductivity such that thermal energy may not flow efficiently into or out of a center or core of the PCM 150. To decrease internal resistance of the PCM 150, the thermal capacitor 100 may include thermal energy transfer features disposed within the cavity 140. In some embodiments, the cavity 140 may include a thermally conductive matrix disposed within the cavity 140 with the PCM 150 disposed within and about the thermally conductive matrix. The thermally conductive matrix may be in the form of an aluminum foam. In certain embodiments, the thermal energy transfer features may include thermal energy transfer fins that extend through the cavity 140 to transfer thermal energy into and out of the core of the PCM 150. The thermal energy transfer features may be formed of material selected to be compatible with the PCM 150 to prevent corrosion of the thermal energy transfer features. In certain embodiments, the thermal energy transfer features may be plated, e.g., electroless nickel plated, to provide corrosion resistance thereof.

With reference now to FIGS. 4-9, a box 310 is disclosed in accordance with an embodiment of the present disclosure. The box 310 is configured to securely hold a vessel 20 filed with biological material or media to be frozen. In some embodiments, the box 310 is configured to position the vessel 20 within the box 310 such that the vessel 20 is held in intimate contact with a thermal energy transfer wall 322 of the box 310. The thermal energy transfer wall 322 of the box 310 may be configured to be positioned in intimate contact with the contact surface of a thermal capacitor, e.g., thermal capacitor 100 (FIG. 1), to enhance thermal energy transfer into and out of the biological material within the vessel 20. In certain embodiments, the box 310 may be configured to substantially immobilize the vessel 20 therewithin. In some embodiments, the vessel 20 may become brittle when frozen such that immobilizing the vessel 20 within the box 310 may protect the vessel 20 from damage. Immobilizing the vessel 20 may reduce or prevent damage to the vessel 20 during transport, freezing, and thawing of the biological material.

The box 310 includes a stationary or fixed wall assembly 320 including the thermal energy transfer wall 322, a top wall 324, a bottom wall 326, and side walls 328. The fixed wall assembly 320 defines a chamber 330 that is configured to receive a carrier 340. The carrier 340 has a body that is sized and dimensioned to fit snugly within the chamber 330 such that the carrier 340 is fixed within the chamber 330. The carrier 340 defines a well 342 that is sized and dimensioned to receive the vessel 20 filled with media. The well 342 may be sized to complement the shape of the vessel 20 and may include void or empty space about the vessel 20. The void or empty space about the vessel 20 may be sized to allow for a change in volume of media within the vessel 20 as the media is frozen. For example, a volume of the media within the vessel 20 may increase as the media is frozen. In some embodiments, the carrier 340 may be formed of a compressible material such that as the media expands, the media may compress portions of the carrier 340 defining the well 342. The carrier 340 may also define channels 344 that are sized and dimensioned to receive accessories attached to the vessel 20. For example, the channels 344 may be sized to receive accessories such as tubing, clamps, seals, and aseptic connectors. The reception of the accessories may position the vessel 20 within the carrier 340. The channels 344 may extend through an entire thickness of the carrier 340 or may only partially extend into a thickness of the carrier 340. For example, where a channel 344 is configured to receive a tube, the channel 344 may extend partially into a thickness of the carrier 340 and where a channel 344 is configured to receive a clamp, the channel 344 may extend through the entire thickness of the carrier 340.

The carrier 340 may include a thermal energy transfer element 346 that is positioned on one side of the well 342. The transfer element 346 may be formed of aluminum to enhance thermal energy transfer into and out of the vessel 20. The transfer element 346 may be coated to prevent or reduce sticking of the material of the vessel 20 to the transfer element 346. Such a coating may promote sliding of the material of the vessel 20 along the transfer element 346. For example, the transfer element 346 may be coated with polytetrafluoroethylene (PTFE) to prevent the vessel 20 from binding or sticking to the transfer element 346. Preventing the vessel 20 from binding or sticking to the transfer element 346 may prevent or reduce breakage of the vessel 20 as a temperature of the media within the vessel 20 changes and the volume of the media changes. The transfer element 346 may be attached to the carrier 340 and may be in contact with the transfer wall 322 of the box 310. The box 310 may include a thermal grease or gel disposed between the transfer wall 322 and the transfer element 346 to enhance thermal energy transfer therebetween.

The box 310 also includes a closure 350 to close the chamber 330 with the vessel 20 therein. The closure 350 includes a closure wall 352 and may include side walls 354 and a top wall 356 that fit within the chamber 330 or on the outside of the chamber 330 adjacent complementary walls of the fixed wall assembly 320.

The closure 350 has an open position (FIG. 5) in which chamber 330 is accessible and a closed position (FIG. 6) in which the closure 350 prevents access to the chamber 330. In some embodiments, the closure 350 may be hinged relative to the fixed wall assembly 320. In such embodiments, the closure wall 352 includes a top edge 351 and a bottom edge 353. The bottom edge 353 may be hinged to the bottom wall 326 such that the closure 350 pivots about a hinge 355 formed between the bottom wall 326 and the bottom edge 353 between the open and closed positions thereof. The top edge 351 may include a closure feature 360 to secure the top edge 351 relative to the top wall 324 when the closure 350 is in the closed position. The closure feature 360 is configured to maintain the closure 350 in a closed position. The closure feature 360 may be a hinged to the top wall 324 such that the closure feature 360 pivots between an unsecured state and a secured state. The closure feature 360 may include ribs 362 that that are received in a crease 364 to hold the closure feature 360 in the secured state. The crease 364 may be defined in opposite sides of the transfer wall 322 and the closure wall 352. In some embodiments, the closure 350 is formed separate from the fixed wall assembly 320 and slides from the bottom wall 326 towards the top wall 324 to close the chamber 330.

When the closure 350 is in the closed position, the closure wall 352 closes the chamber 330 such that the vessel 20 is held in place within the carrier 340. In some embodiments, the carrier 340 may have a thickness such that as the box 310 is closed, the carrier 340 is compressed between the transfer wall 322 and the closure wall 352. The closure 350 may include a pad 358 attached to an inside surface 357 of the closure wall 352. The pad 358 may extend over the entire inside surface 357 or may be positioned to align with the well 342 such that the pad 358 engages the vessel 20. The pad 358 may be formed of a material similar to the carrier 340 or may be formed of a different material. In some embodiments, the pad 358 is an insulative material to insulate the closure wall 352 from the vessel 20. Internal surfaces of the box 310 including, but not limited to, the transfer wall 322 and the inside surface 357, may have a hydrophobic or a super hydrophobic coating to prevent sticking of the vessel 20. The coating may prevent damage to the vessel 20 when the box 310 is opened.

Referring now to FIGS. 10-13, a carrier holder 410 is provided in accordance with an embodiment of the present disclosure. The carrier holder 410 includes a rack 420 having a first side 422 and a second side 424. Each side of the rack 420 includes a number of box holders 430 that are each configured to receive a box 310. As shown, the rack 420 includes three box holders 430 on each side such that the rack 420 supports six boxes 310. In embodiments, the rack 420 may be sized to hold a range of one to ten or more boxes on each side. The number of box holders 430 of the rack 420 may depend on the size of the vessels within the respective boxes and the size of the freezer to which the rack is inserted as detailed below. The box holders 430 may be configured to orient the boxes 310 such that the closure walls 352 of the boxes 310 face the interior of the rack 420 to oppose a closure wall 352 of another box 310 and the transfer walls 322 face the exterior of the rack 420. For example, box holders 430 may include a key 432 and the boxes 310 may include a keyway 312 that is configured to receive the key 432 to orient the box 310 is orientated within the box holder 430. The key 432 may be a protrusion, a shaped corner, or other feature that must be received in a keyway to orient the box 310. In some embodiments, the box 310 includes a key and the box holder 430 defines a keyway to receive the key to orient the box 310 within the box holder 430. In certain embodiments, the box holder 430 or the box 310 may include more than one key and the other of the box holder 430 and the box 310 may include complementary keyways to receive the respective keys. In particular embodiments, the box holder 430 and the box 310 may each include a key and a keyway with the other including a complementary keyway and key.

The rack 420 includes a compression system 440 that allows the first side 422 to move towards and away from the second side 424 to allow for insertion and removal of the carrier holder 410 into a frame 510 without the boxes 310 contacting the thermal capacitors and to contact the thermal capacitors when fully inserted, as detailed below. The compression system 440 includes a post 442 and a biasing member 444. The post 442 extends between the first side 422 and the second side 424 and includes a cap 443 that limits an extent that the second side 424 can be spaced from the first side 422. The biasing member 444 is positioned between the first side 422 and the second side 424 to urge the first side 422 and the second side 424 apart from one another. In some embodiments, the biasing member 444 is a compression spring that is disposed about the post 442. The compression system 440 also includes bosses 446 that are positioned on the first side 422 and the second side 424. The bosses 446 extend beyond the extremity of the box holders 430 and are positioned at the corners of the first side 422 and the second side 424. In some embodiments, the first side 422 or the second side 424 may include another bosses 446 at a midpoint of the top and bottom of the first side 422 and the second side 424. The bosses 446 may be formed of a material to promote sliding or may include a slide promoting coating. For example, the bosses 446 may be at room temperature when inserted in a frame that is at a cryotemperature, e.g., −80° C., such that a slide promoting coating may prevent binding of the bosses 446 or the carrier holder 410 during insertion or removal. The bosses 446 may include bevels or chamfers 448 on leading and trailing surfaces thereof to aid in insertion and removal.

The rack 420 may include a handle 428 that is attached to the first side 422 of the rack 420 for a user to grip during insertion and removal of the carrier holder 410 into a frame. As shown, the handle 428 has a substantially trapezoidal profile but may have a variety of shapes including, but not limited to, a C-shaped profile or a T-shaped profile.

Figure 14:
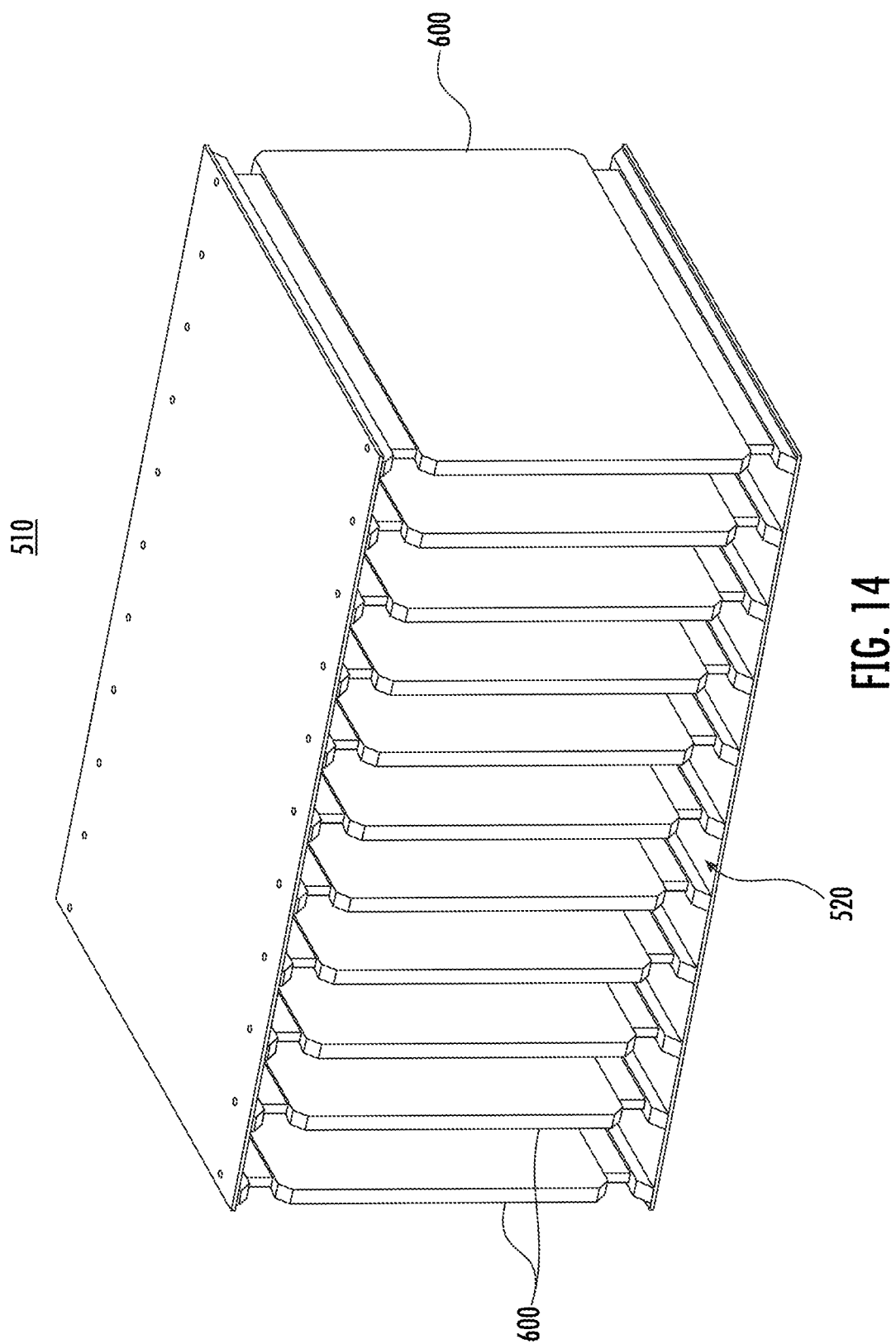
FIG. 14 is a perspective view of a frame provided in accordance with an embodiment of the present disclosure including a plurality of thermal capacitors.

With reference to FIG. 14, a frame 510 is disclosed in accordance with embodiments of the present disclosure. The frame 510 includes a plurality of thermal capacitors 600 in fixed relation relative to one another with a channel 520 disposed between the thermal capacitors 600. The channels 520 are sized to receive a carrier holder 410 such that the transfer wall 322 of the boxes 310 within the carrier holder 410 are each in contact with a thermal capacitor 600 when the carrier holders 410 (FIG. 11) are received within frame 510.

Figure 15:
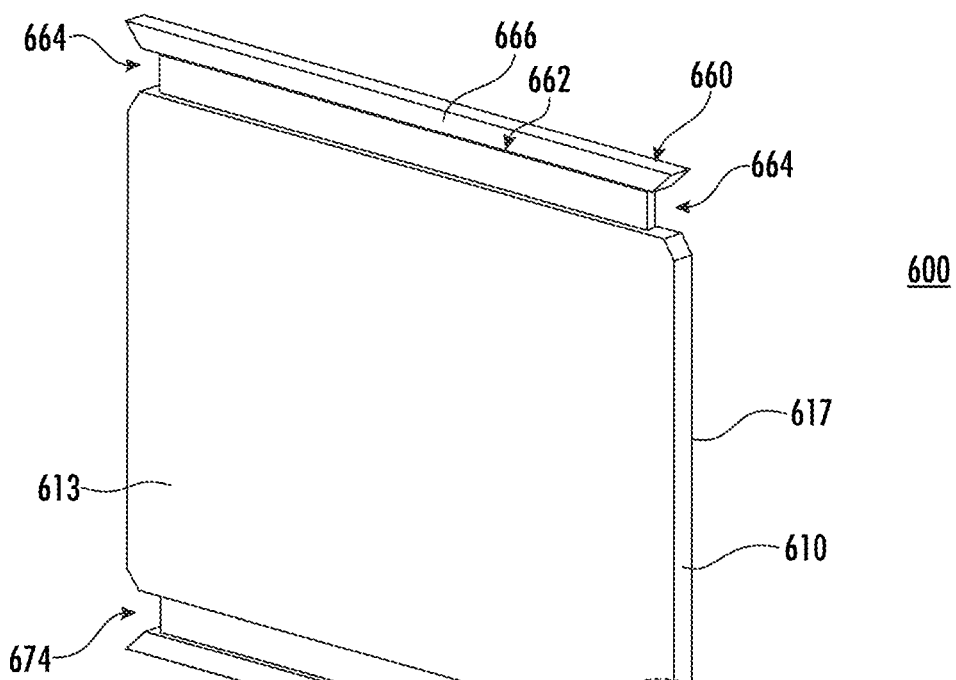
FIG. 15 is a side perspective view of a thermal capacitor of FIG. 14.
Figure 16:
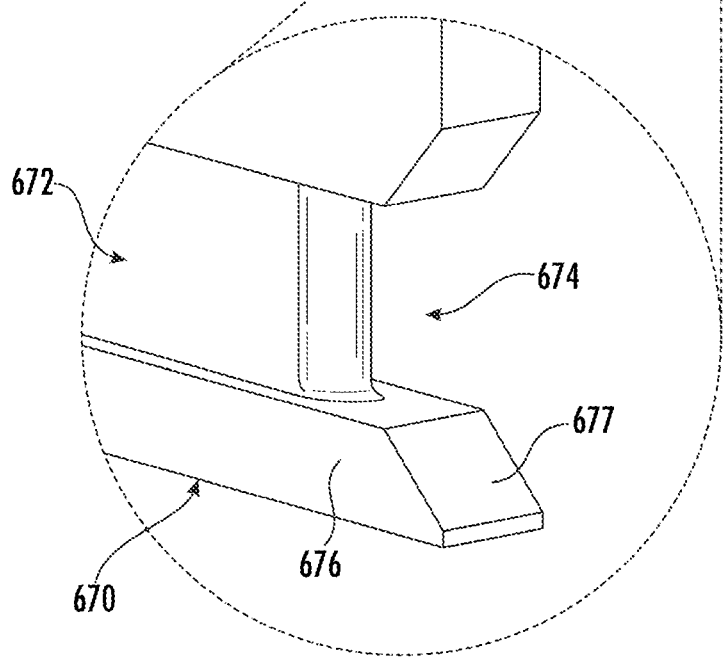
FIG. 16 is an enlarged view of a portion of the thermal capacitor of FIG. 15.

Referring to FIGS. 15 and 16, each of the thermal capacitors 600 of the frame 510 (FIG. 14) are shaped to work in concert with the carrier holders 410 (FIG. 11) such that as a carrier holder 410 is slidably inserted between adjacent thermal capacitors 600, the boxes 310 are spaced apart from the thermal capacitors 600 and when the carrier holder 410 is fully inserted, the boxes 310 are in contact with the thermal capacitors 600. The thermal capacitors 600 include a shell 610 that has a first contact surface 613 and a second contact surface 617 that are opposite one another and form a central portion of the thermal capacitors 600.

Figure 11:
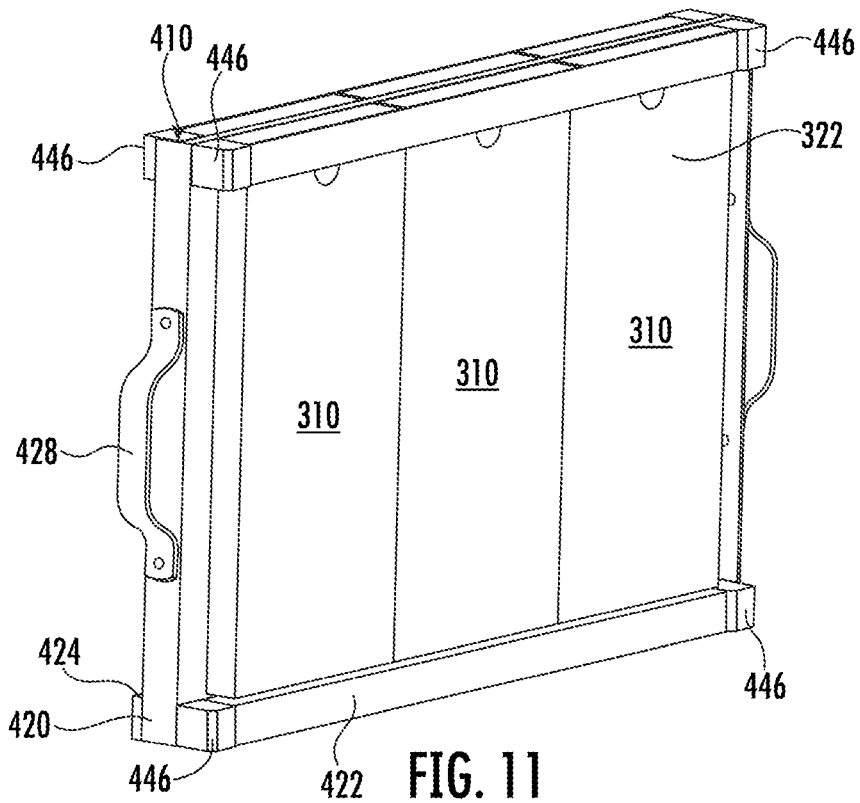
FIG. 11 is a perspective view of the carrier holder of FIG. 10 with a plurality of boxes received therein.
Figure 12:
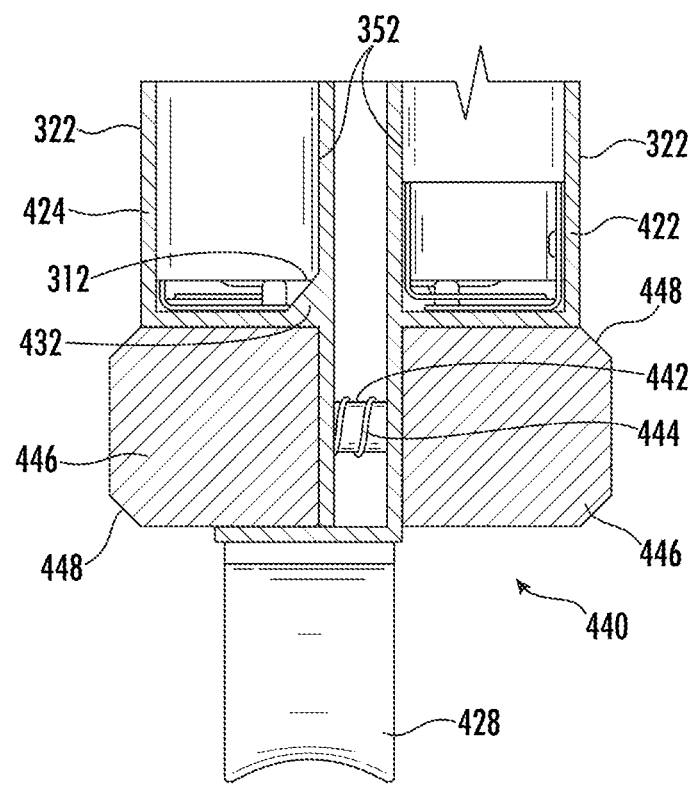
FIG. 12 is a top view of a portion of the carrier holder of FIG. 11.
Figure 13:
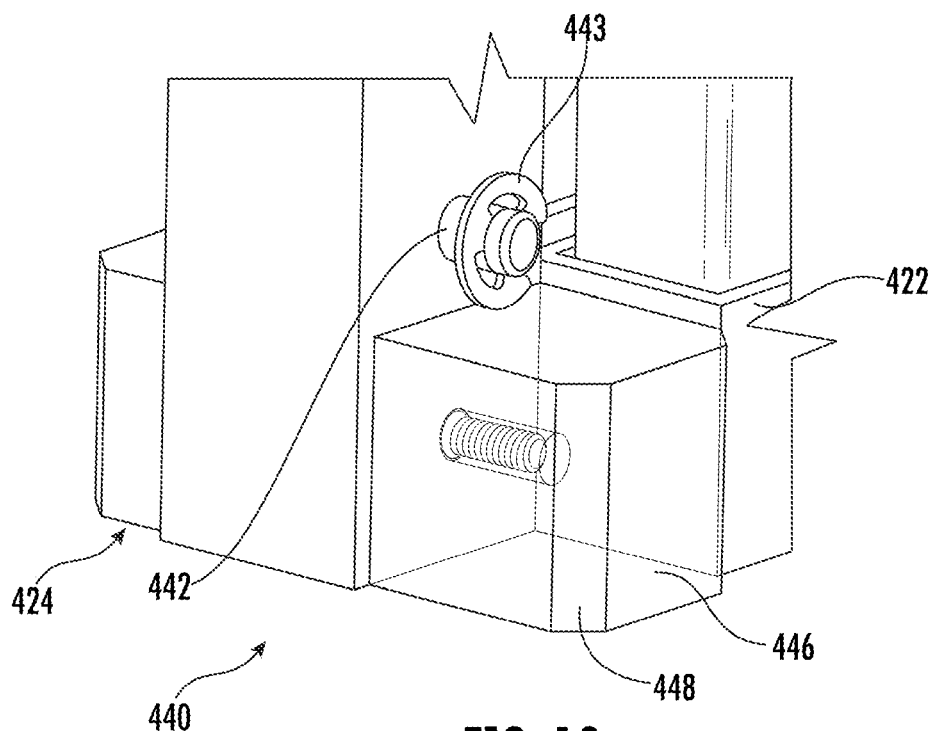
FIG. 13 is an enlarged view of a portion of the carrier holder of FIG. 11 with a portion of the rack removed.

The shell 610 includes a top portion 660 and a bottom portion 670 that extend above and below the first contact surface 613 and the second contact surface 617, respectively. The top portion 660 and the bottom portion 670 are similar to one another; as such, only the bottom portion 670 will be detailed herein with like elements of the top portion 660 being labeled with a preceding "66" replacing the "67" of the similar element of the bottom portion 670. The bottom portion 670 includes grooves 672, cutouts 674, and a rail 676. The grooves 672 extend the length of the shell 610 and are configured to slidably receive the bosses 446 of the carrier holder 410 (FIG. 11).

Figure 17:
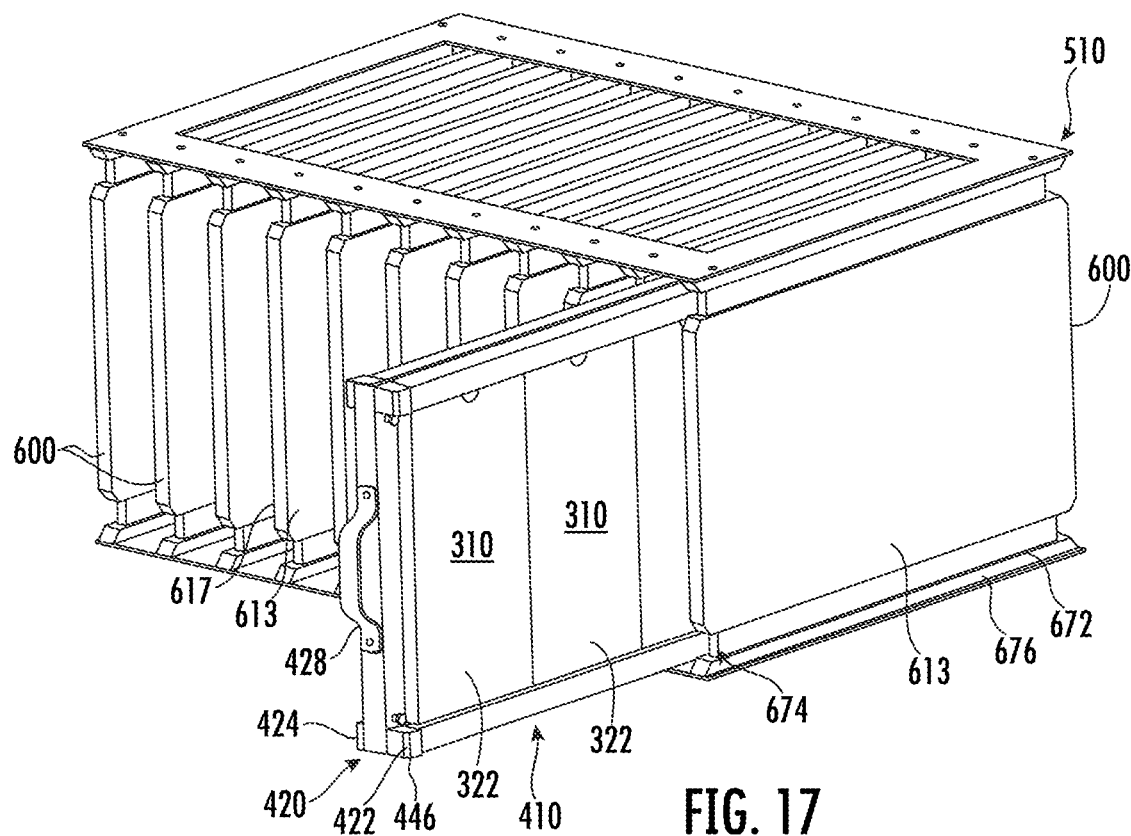
FIG. 17 is a perspective view of the frame of FIG. 14 with a carrier holder of FIG. 11 being inserted into the rack.
Figure 18:
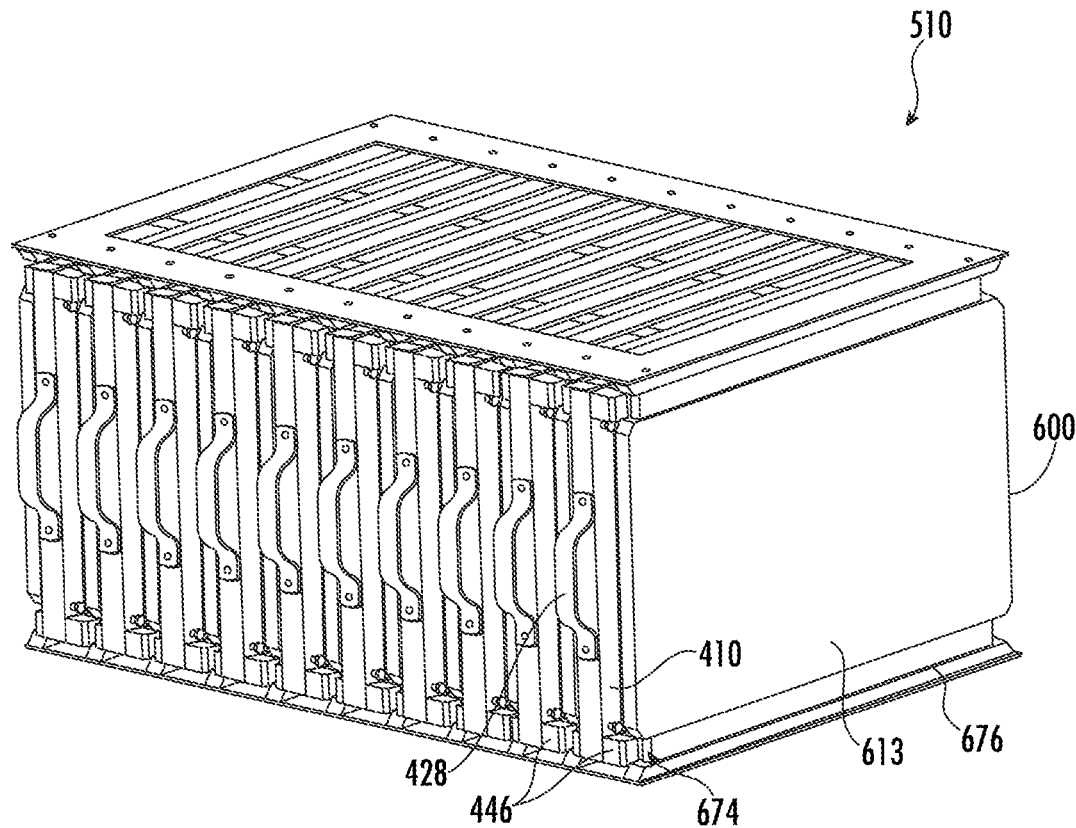
FIG. 18 is a perspective view of the frame of FIG. 14 loaded with a plurality of carrier holders.

With additional reference to FIGS. 17 and 18, when the bosses 446 are received within the grooves 672, the first side 422 and the second side 424 of the rack 420 are in a compressed state relative to one another such that the boxes 310 are spaced apart from the thermal capacitors 600. The cutouts 674 are positioned at the end of the grooves 672 and sized to receive the bosses 446 when the carrier holder 410 is fully received within the frame 510. When the bosses 446 are received within the cutouts 674, the first side 422 and the second side 424 of the rack 420 are in an uncompressed state relative to one another such that the boxes 310 are in contact with the thermal capacitors 600. The rail 676 is sized to support the carrier holder 410 as it is inserted and removed from the frame 510. The rail 676 may include a ramp 677 at a leading end thereof that guides the bosses 446 into the groove 672.

With reference to FIGS. 19-22, the insertion of a carrier holder 410 into a channel 520 of a frame 510 is described in accordance with the present disclosure. Initially referring to FIG. 19, the carrier holder 410 is aligned with the channel 520 such that the bosses 446 of the carrier holder 410 are aligned with the grooves 662, 672 of adjacent thermal capacitors 600 defining the channel 520. When the carrier holder 410 is aligned with the channel 520 outside the channel 520, the carrier holder 410 is in the uncompressed state such that transfer walls 322 of the boxes 310 within the carrier holder 410 may define a thickness of the carrier holder 410 that is greater than a width of the channel 520.

Figure 20:
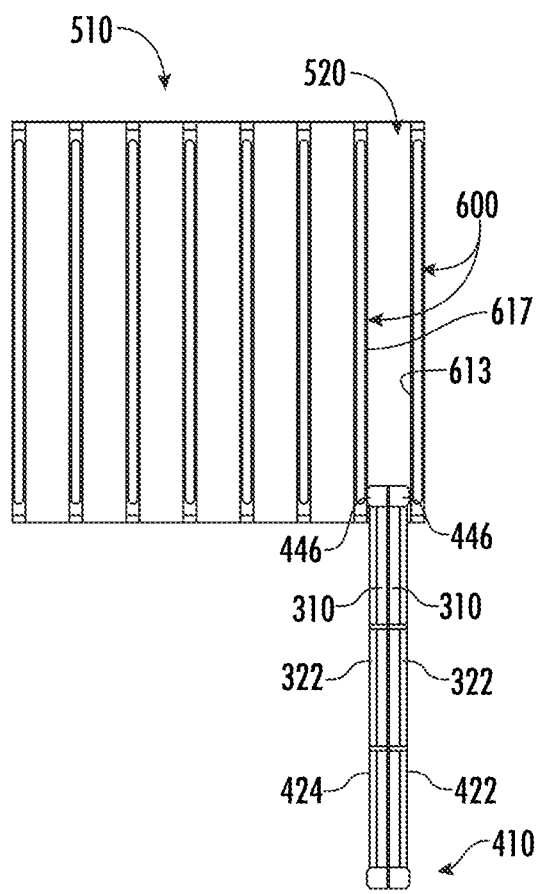
FIG. 20 is a top view of the carrier holder and the frame of FIG. 19 with the carrier holder partially inserted into the channel and in a compressed configuration such that boxes of the carrier holder are spaced apart from thermal capacitors of the rack.
Figure 21:
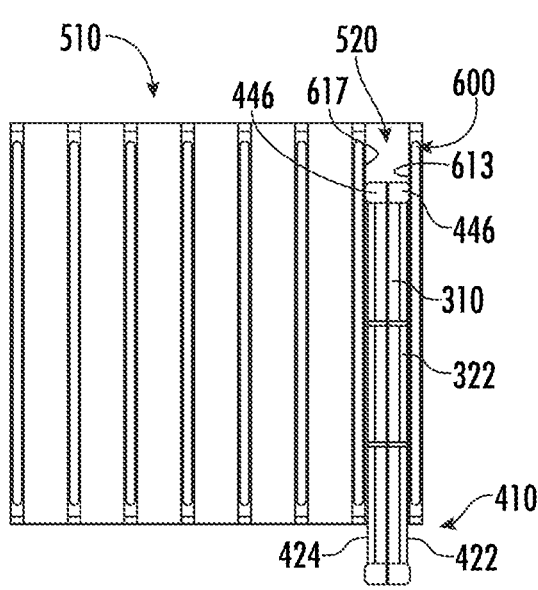
FIG. 21 is a top view of the carrier holder and the frame of FIG. 20 with the carrier holder further inserted into the channel and in the compressed configuration.

As the bosses 446 enter the grooves 662, 672 (FIG. 15) of the thermal capacitors 600, the bosses 446 urge the first side 422 and the second side 424 of the rack 420 towards one another such that the carrier holder 410 moves towards a compressed state as shown in FIG. 20. In the compressed state, the transfer walls 322 of the boxes 310 within the carrier holder 410 define a thickness that is less than a width of the channel 520 such that as the carrier holder 410 is inserted into frame 510 the transfer walls 322 are spaced apart from contact surfaces 613, 617 of the thermal capacitors 600. The engagement of the bosses 446 with the grooves 662, 672 maintains the carrier holder 410 in a compressed state during insertion as shown in FIG. 21. Maintaining the carrier holder 410 in a compressed state may prevent contact between boxes 310 and other elements of the carrier holder 410 and the contact surfaces 613, 617 of the thermal capacitors 600 during insertion to prevent or reduce possible damage to the thermal capacitors 600 during insertion. Preventing or reducing possible damage to the thermal capacitors 600 may extend the life of the thermal capacitors 600.

Figure 22:
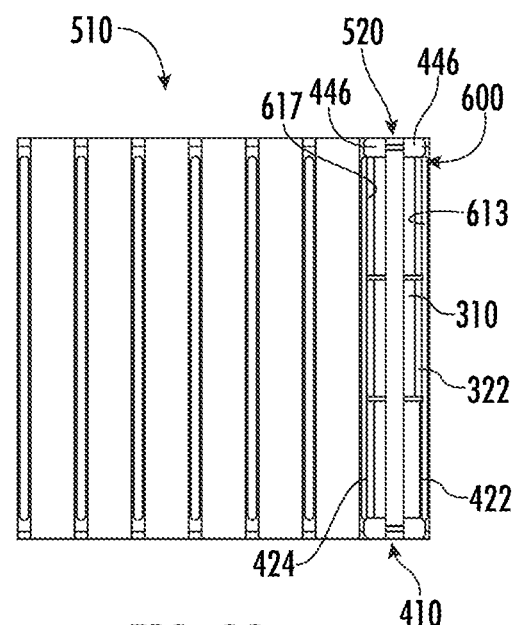
FIG. 22 is a top view of the carrier holder and the frame of FIG. 21 with the carrier holder fully inserted into the channel and in an uncompressed configuration such that the boxes are in contact with the thermal capacitor of the rack.

When the carrier holder 410 is fully inserted as shown in FIG. 22, the bosses 446 exit the grooves 662, 672 and are received within the cutouts 664 such that the biasing members 444 urge the first side 422 and the second side 424 of the rack 420 towards the uncompressed state such that transfer walls 322 of the boxes 310 are in intimate contact with a respective one of the contact surfaces 613, 617 of the thermal capacitors 600. The intimate contact between the transfer walls 322 and the contact surfaces 613, 617 may encourage or promote thermal energy transfer into or out of media within the boxes 310 to rapidly freeze the media.

The removal of the carrier holder 410 is the reverse of insertion with a user grasping the handle 428 (FIG. 17) of the carrier holder 410 to remove the carrier holder 410 from the frame 510. As the carrier holder 410 begins to move from the fully inserted position shown in FIG. 22, the chamfers 448 of the bosses 446 engage the grooves 662, 672 to move the carrier holder 410 towards a compressed position such that the boxes 310 disengage the contact surfaces 613, 617 of the thermal capacitors 600 until the carrier holder 410 is fully removed from the frame 510 or returned to the fully inserted position.

As described above, the thermal capacitors 600 may be placed in a ULT Freezer to enhance capabilities of the ULT Freezer to rapidly freeze media. As noted above, the media may be disposed in boxes 310 which may be placed in carrier holders 410 to protect the media during handling and freezing. As described below, the carriers 340 detailed above, may also simplify handling of media during distribution of media and packing of vessels including the media into the boxes 310.

Figure 23:
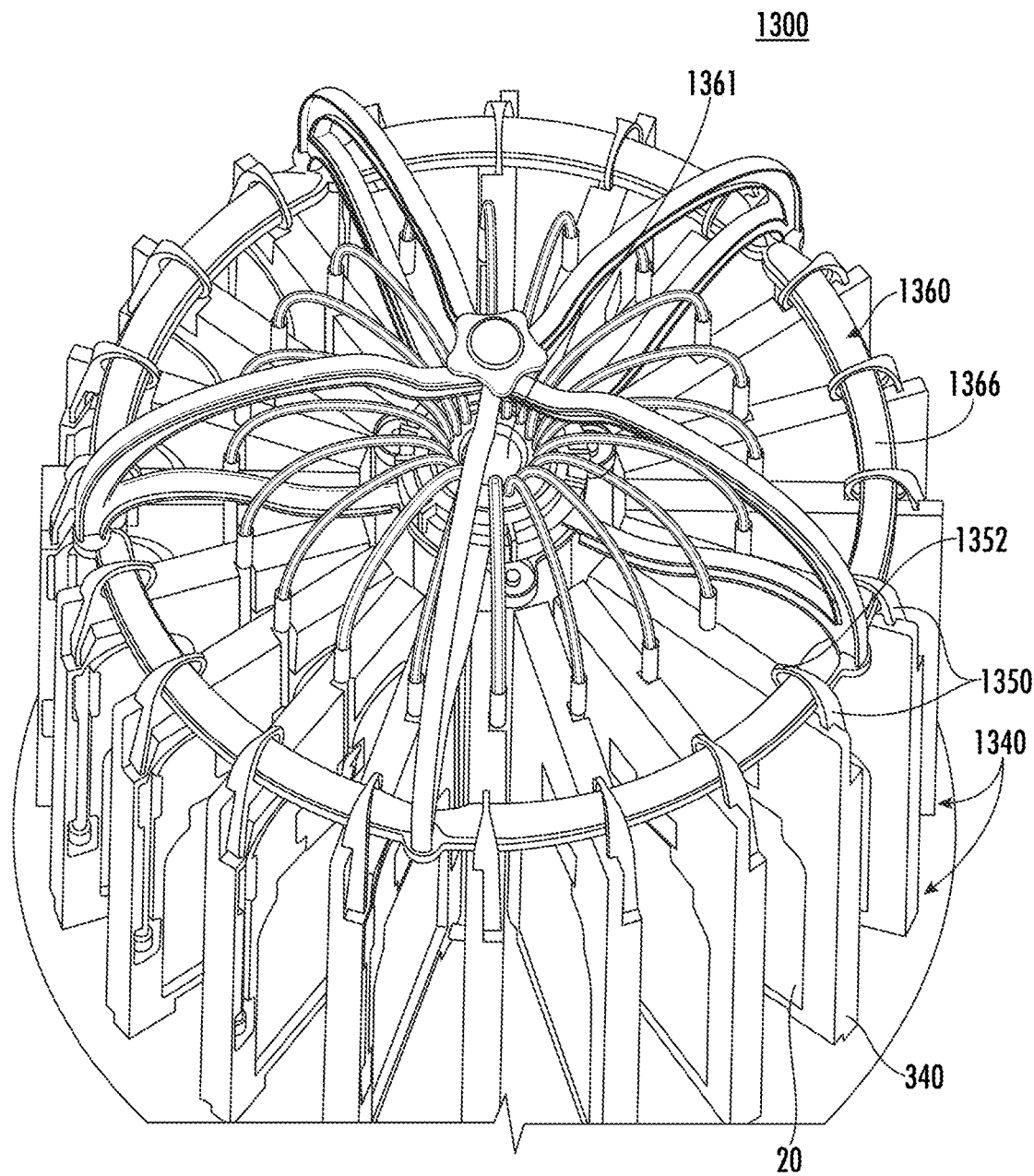
FIG. 23 is a perspective view of a fluid distribution system including a plurality of carrier assemblies hung from a frame of the fluid distribution system in accordance with an embodiment of the present disclosure.
Figure 24:
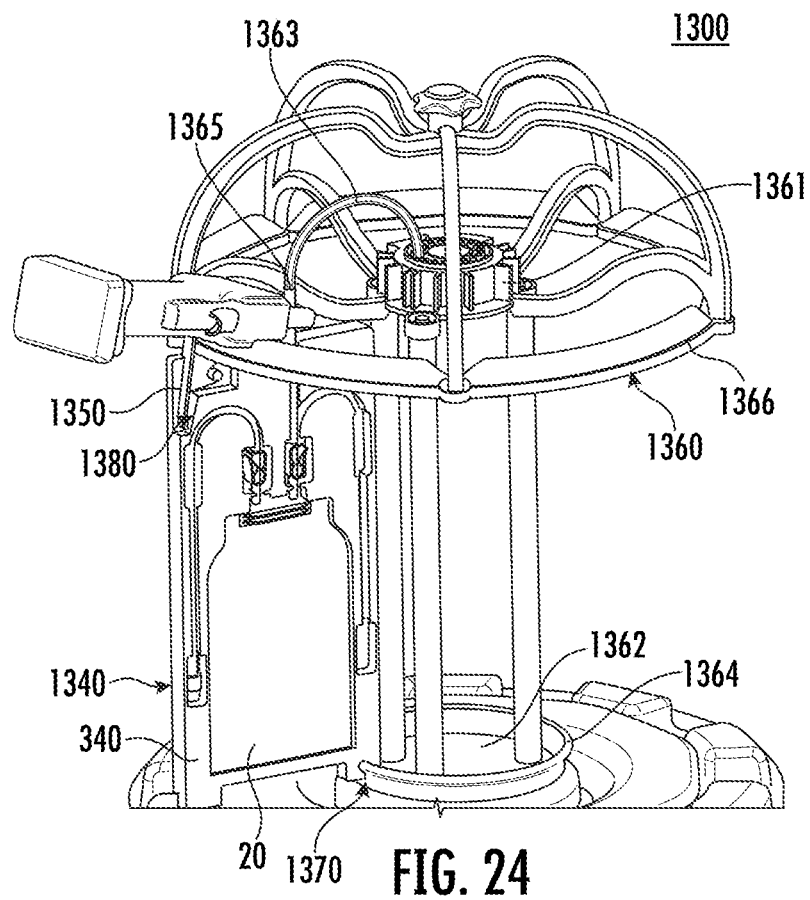
FIG. 24 is another perspective view of the fluid distribution system of FIG. 23 including a carrier assembly.
Figure 25:
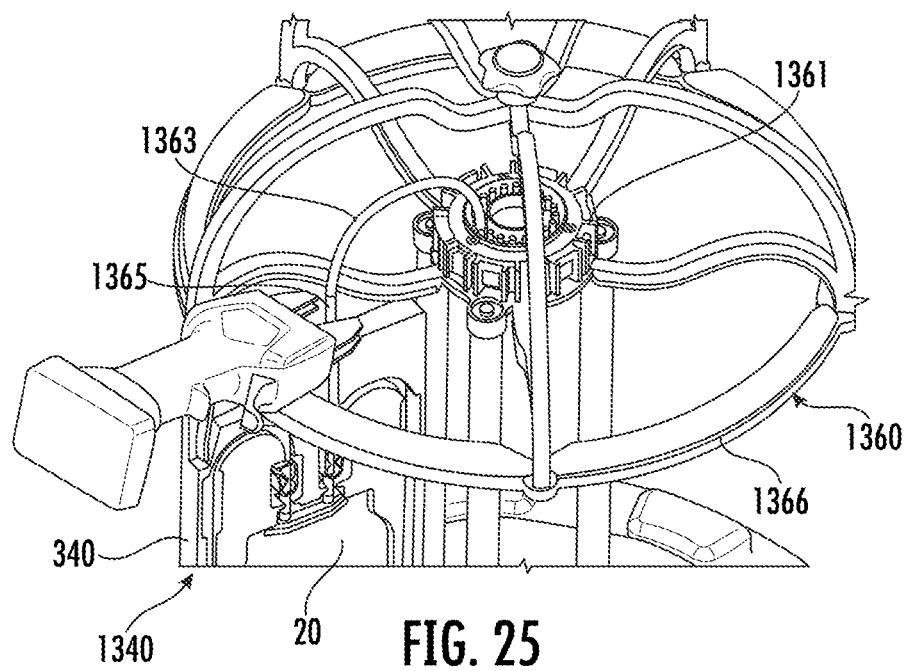
FIG. 25 is another perspective view of the fluid distribution system of FIG. 24 with the carrier assembly being detached from the fluid distribution system.
Figure 26:
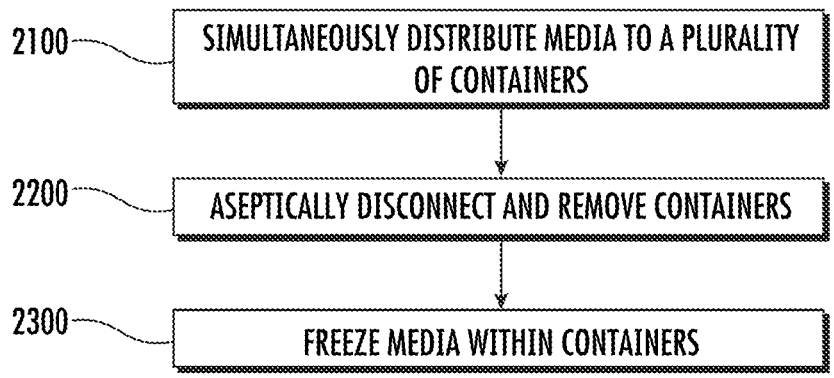
FIG. 26 is a flow chart of a method of distributing and freezing media in accordance with an embodiment of the present disclosure.
Figure 27:
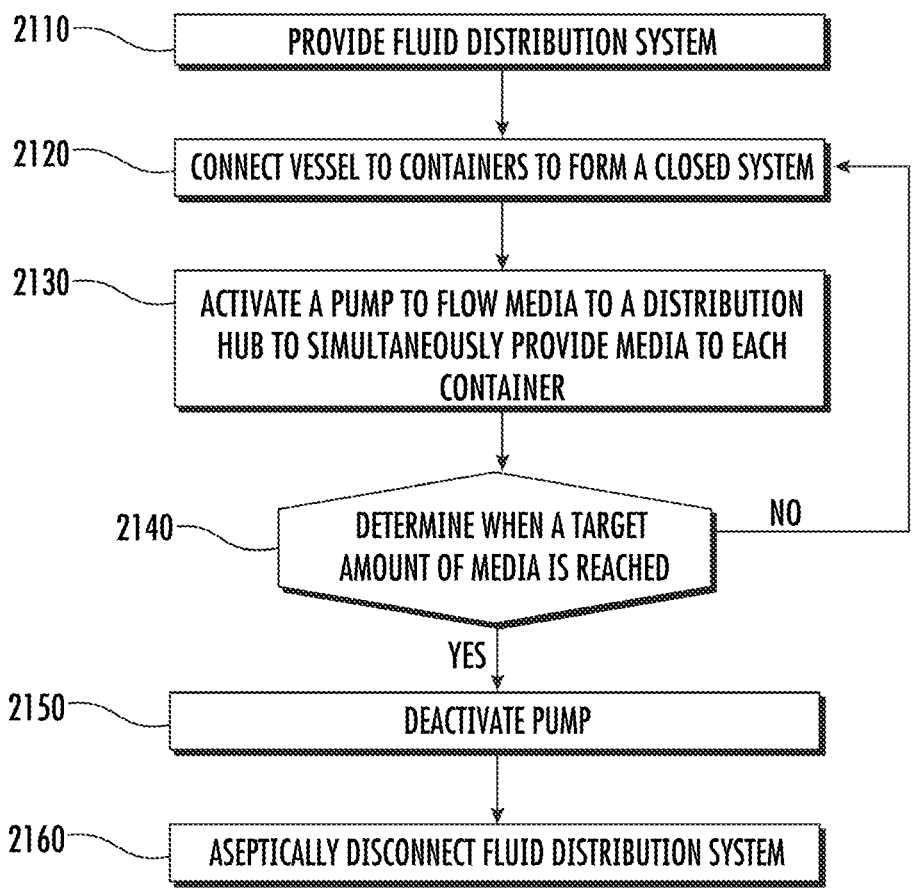
FIG. 27 is a flow chart of a method of aseptically distributing media in accordance with an embodiment of the present disclosure.

Referring now to FIGS. 23-25, a carrier assembly 1340 is disclosed in accordance with an exemplary embodiment of the present disclosure. The carrier assembly 1340 includes a carrier, a vessel, a latch or hook 1350, and a frame 1360. For the purposes of this disclosure, the carrier 340 and the vessel 20 will be used to describe the carrier assembly 1340 with additional features defined in the carrier 340 to allow the carrier to hang from a frame with the vessel 20 supported therein. The carrier 340 includes a notch 1370 at a bottom edge of the carrier 340 that is configured to be positioned towards the inside of the frame 1360. The carrier 340 also includes a nook 1380 at a top edge of the carrier 340 on an opposite side of the carrier 340 that is configured to be positioned towards an outside of the frame 1360 also shown in FIG. 7. The hook 1350 is received in the nook 1380 such that the hook 1350 includes a finger 1352 that extends from the carrier 340.

The frame 1360 includes a lower support 1362 and an upper support 1366. The frame 1360 may also include a fluid distribution system that is configured to simultaneously distribute fluid to a plurality of vessels 20 supported about a central distribution hub 1361. The lower support 1362 may be a plate or a dish including a rim 1364 that is sized to receive the notch 1370. The upper support 1366 is in the form of a circular rail or a ring about the central distribution hub 1361. The finger 1352 of the hook 1350 engages the upper support 1366 to support the carrier 340 and thus, the vessel 20 within the carrier, about the central distribution hub 1361. Engagement between the hook 1350 and the upper support 1366 of the frame 1360 and/or the notch 1370 with the lower support 1362 may limit the degrees of freedom of the carrier assembly 1340 with respect to the frame 1360 such that the carrier assembly is fixed in place until the hook 1350 is released from the frame 1360.

When the carrier assembly 1340 is hung in the frame 1360, an inlet tube 1363 of the vessel 20 extends from the central distribution hub 1361 into the vessel 20 such that fluid from the distribution hub flows into the vessel 20. The inlet tube 1363 may include an aseptic seal element 1365 that can be aseptically severed when the vessel 20 is filled. The frame 1360 may be configured to simultaneously distribute fluid to between 1 and 40 carrier assemblies 1340, e.g., 5, 10, or 20 carrier assemblies 1340. An exemplary aseptic seal element is available as QUICKSEAL® from Sartorius. Various elements of distribution hubs, fluid distribution systems, and racks are described in U.S. patent application Ser. No. 17/132,958, filed Mar. 15, 2021.

Referring now to FIGS. 26-29, a method is disclosed in accordance with the present disclosure and is referred to generally as method 2000. The method 2000 may include sub-methods or processes that when combined result in the method 2000. The method 2000 may include method 2100 of simultaneously distributing media to a plurality of vessels, method 2200 of aseptically disconnecting and removing the vessels from a fluid distribution system, and method 2300 of freezing the media within the vessels.

The method 2100 of simultaneously distributing media to a plurality of vessels is detailed with reference to the fluid distribution system 1300 of FIG. 24. The fluid distribution system 1300 is provided with a plurality of carrier assemblies 1340 disposed about a central distribution hub 1361 of the fluid distribution system 1300 (Step 2110). The fluid distribution system 1300 may include any number of carrier assemblies 1340. For example, the fluid distribution system 1300 may include between 1 and 40 carrier assemblies 1340 and in some embodiments may include 5, 10, or 20 carrier assemblies 1340. When provided, each carrier assembly 1340 is hung from an upper support 1366 of the frame 1360 by a hook 1350 that is received in a nook 1380 defined in the carrier 340 and is supported by a lower support 1362 of the frame 1360 with a rim 1364 of the lower support received in a notch 1370 defined in the carrier 340. The hook 1350 and the notch 1370 of the carrier 340 cooperate with the upper support 1366 and the lower support 1362 to hold the carrier assembly 1340 in position relative to the central distribution hub 1361. The carrier assembly 1340 includes a vessel 20 supported within the carrier 340. The vessel 20 includes inlet tube 1363 that fluidly connects the central distribution hub 1361 and the vessel 20. The inlet tube 1363 extends through a channel 344 of the carrier 340.

The fluid distribution system 1300 is connected to a vessel containing media to be distributed to the vessels 20 to form a closed system (Step 2120). The fluid distribution system 1300 may include an inlet or supply tube (not explicitly shown) that fluidly connects the central distribution hub 1361 to the vessel. With the fluid distribution system 1300 connected to the vessel, a pump (not explicitly shown) is activated to provide media to the central distribution hub 1361 which distributes the media to the vessels 20 (Step 2130). As media is provided to the vessels 20, an amount of media in the vessels is measured to determine when a target amount of media is distributed to each vessel 20 (Step 2140). The target amount of media may be measured by a scale weighing the fluid distribution system 1300 or a flow meter measuring an amount of media passing into or through the supply tube. When the target amount of media is reached, the pump is deactivated (Step 2150). After the pump is deactivated, supply tube of the fluid distribution system 1300 may be aseptically disconnected from the vessel (Step 2160). In some embodiments, media is provided to the central distribution hub 1361 via gravity without the use of a pump. In such embodiments, a valve may be operated to activate and deactivate flow of media to the fluid distribution system 1300. In certain embodiments, after the pump is deactivated and before the supply tube is aseptically disconnected, a purge fluid may be introduced into the supply tube to push media into the vessels 20. The purge fluid may be a buffer or air.

Figure 28:
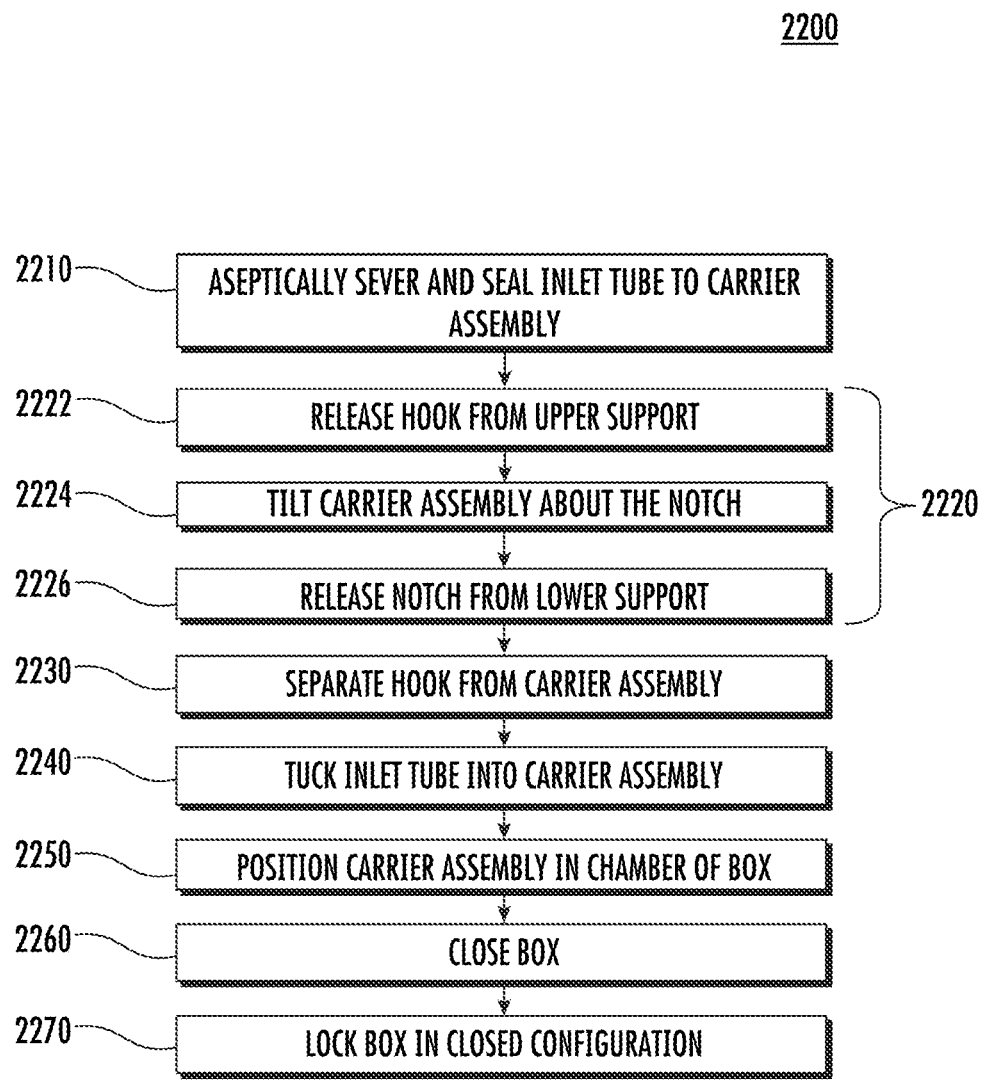
FIG. 28 is a flow chart of a method of aseptically disconnecting a carrier assembly in accordance with an embodiment of the present disclosure.

With particular reference to FIG. 28, once the pump is deactivated, the carrier assemblies 1340 are aseptically disconnected and loaded into boxes 310 in accordance with exemplary embodiments of the present disclosure as detailed with respect to method 2200. Initially with reference to the fluid distribution system of FIGS. 24 and 25, when provided the inlet tube 1363 includes an aseptic seal element 1365 disposed thereabout. To aseptically disconnect a carrier assembly 1340 from the fluid distribution system 1300, a tool 1650 is used to sever the aseptic seal element 1365 such that the inlet tube 1363 is severed and aseptically sealed on both of the severed ends (Step 2210). With the inlet tube 1363 severed, the vessel 20 is a closed system within the carrier assembly 1340. After the inlet tube 1363 is severed, the carrier assembly 1340 can be removed from the fluid distribution system 1300 (Process 2220). To remove the carrier assembly 1340, the carrier assembly 1340 is lifted such that the hook 1350 is released from the upper support 1366 of the frame 1360 (Step 2222). With the hook 1350 released from the upper support 1366, the carrier assembly 1340 is tilted or pivoted about the notch 1370 and the lower support 1362 (Step 2224). With the carrier assembly 1340 tilted or pivoted about the notch 1370, the carrier assembly 1340 can be lifted such that the notch 1370 is free from the lower support 1362 (Step 2226). In some embodiments, the carrier assembly 1340 is lifted and removed from the upper support 1366 and the lower support 1362 simultaneously with one another. With the inlet tube 1363 severed and the hook 1350 and the notch 1370 free, the carrier assembly 1340 is free and can be removed from the fluid distribution system 1300.

Figure 7:
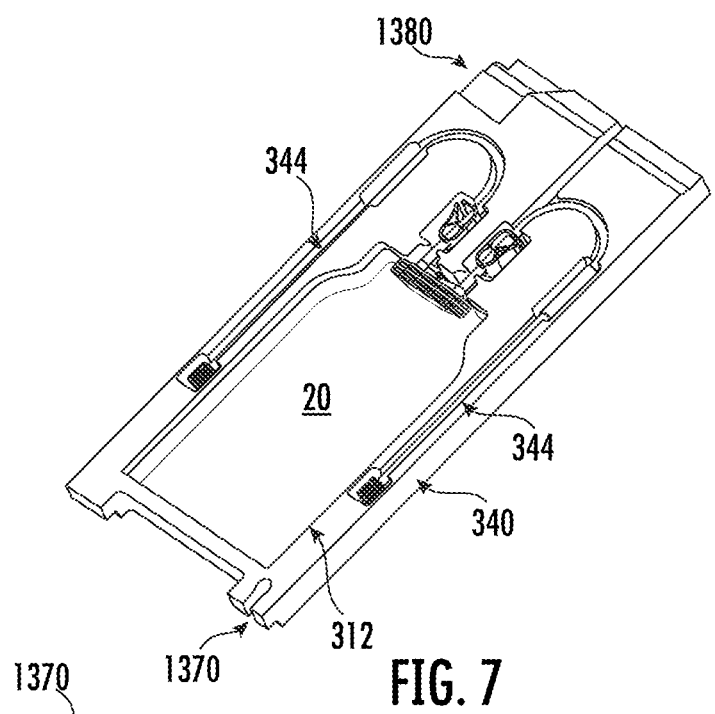
FIG. 7 is a front perspective view of the carrier of FIG. 4 with a vessel disposed within the carrier.
Figure 8:
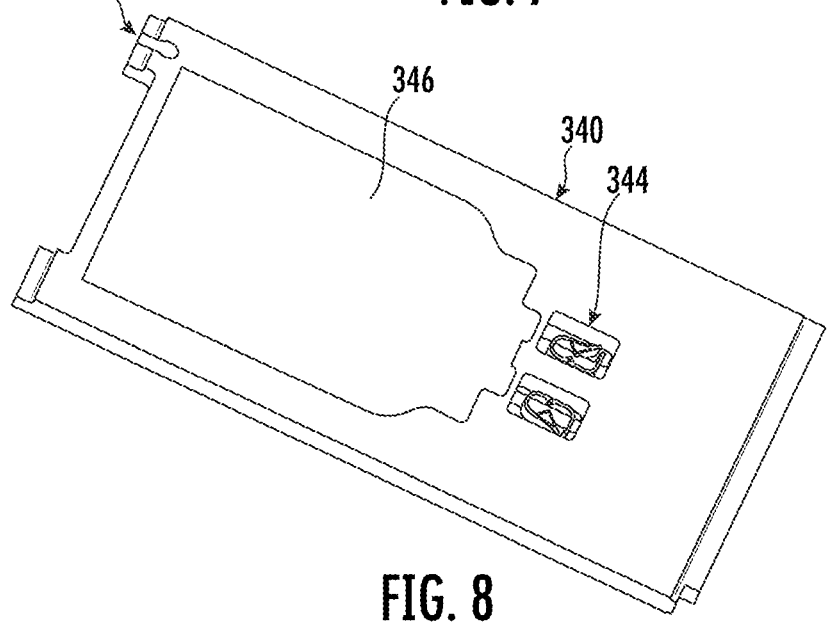
FIG. 8 is a back perspective view of the carrier of FIG. 7.
Figure 9:
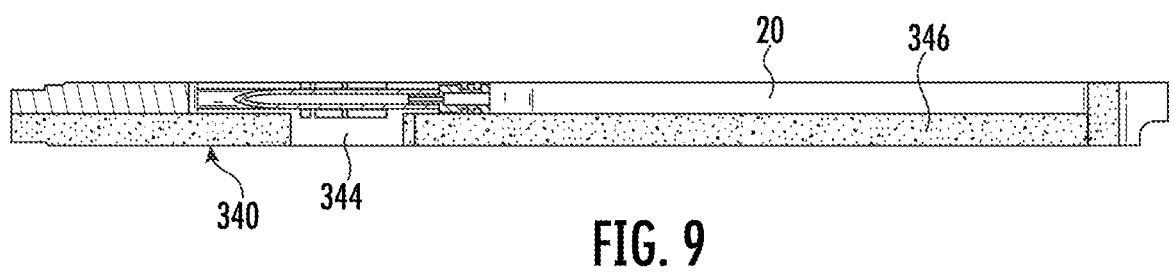
FIG. 9 is a cross-sectional view of the carrier of FIG. 7.
Figure 10:
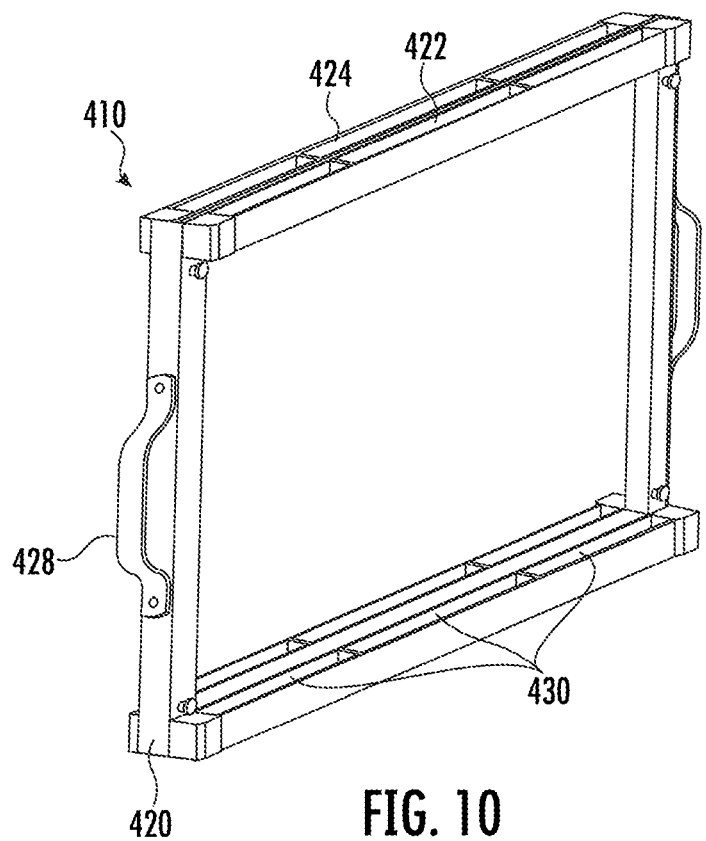
FIG. 10 is a perspective view of a carrier holder provided in accordance with an embodiment of the present disclosure.

When the carrier assembly 1340 is removed from the fluid distribution system 1300, the hook 1350 can be separated from the carrier assembly 1340 (Step 2230). The hook 1350 may be removed by pulling on the hook 1350 such that a portion of the hook 1350 engaged with the nook 1380 of the carrier 340 is separated from the carrier 340. With the hook 1350 separated from the carrier 340, the inlet tube 1363 is tucked into a channel 344 of the carrier 340 (Step 2240) such that the inlet tube 1363 is disposed within the channel 344 as shown in FIG. 7. Specifically, the inlet tube 1363 extends through a channel 344a to exit the carrier 340 when connected to the fluid distribution system 1300 is tucked into the channel 344b such that the inlet tube 1363 is disposed within the carrier 340.

With the inlet tube 1363 disposed within the carrier 340, the carrier assembly 1340 including the carrier 340, the vessel 20 filled with media, and the inlet tube 1363 are positioned in a box 310 as shown in FIG. 4 (Step 2250). The carrier assembly 1340 is positioned in the box 310 with the box 310 in an open configuration such that the closure 350 is pivoted away from the fixed wall assembly 320 to provide access to the chamber 330. When the carrier assembly 1340 is positioned in the box 310, a transfer element 346 of the carrier 340 is in intimate contact with the transfer wall 322 of the box 310. The transfer wall 322 may include a thermal gel or material positioned where the transfer element 346 is positioned to enhance contact and thermal energy transfer between the transfer wall 322 and the transfer element 346.

With the carrier assembly 1340 disposed in the chamber 330, the closure 350 is pivoted to the closed configuration to enclose the carrier assembly 1340 within the chamber 330 as shown in FIG. 6 (Step 2260). The closure 350 may include a pad 358 that engages the carrier 340 and/or the vessel 20 to urge the vessel 20 into contact with the transfer element 346. With the closure 350 in the closed configuration, the closure feature 360 is moved to the engage the closure 350 and the fixed wall assembly 320 to lock or maintain the box 310 in the closed configuration (Step 2270). The closure feature 360 may be a C-shaped element that is hinged to the fixed wall assembly 320. The closure feature 360 may include ribs 362 that engage a crease 364 to prevent the closure 350 from moving towards the open configuration.

The method 2200 may be repeated until all the carrier assemblies 1340 are removed from the fluid distribution system 1300 and loaded into a respective box 310. The method 2200 may reduce an amount of time to remove and pack vessels 20 into boxes for freezing when compared to previous methods. As such, a single lab technician or user may be able remove and pack an increased number of vessels 20 in a given amount of time. This increase in production may increase production efficiency of a facility. In addition, by preloading the vessels 20 in a carrier 340 that can be hung directly on the fluid distribution system 1300, the precision and accuracy of the packing of the vessels 20 into boxes 310 may be improved. Further, the handling of the vessels 20 may be simplified from disconnecting the vessels 20 and packing into the boxes 310.

Figure 29:
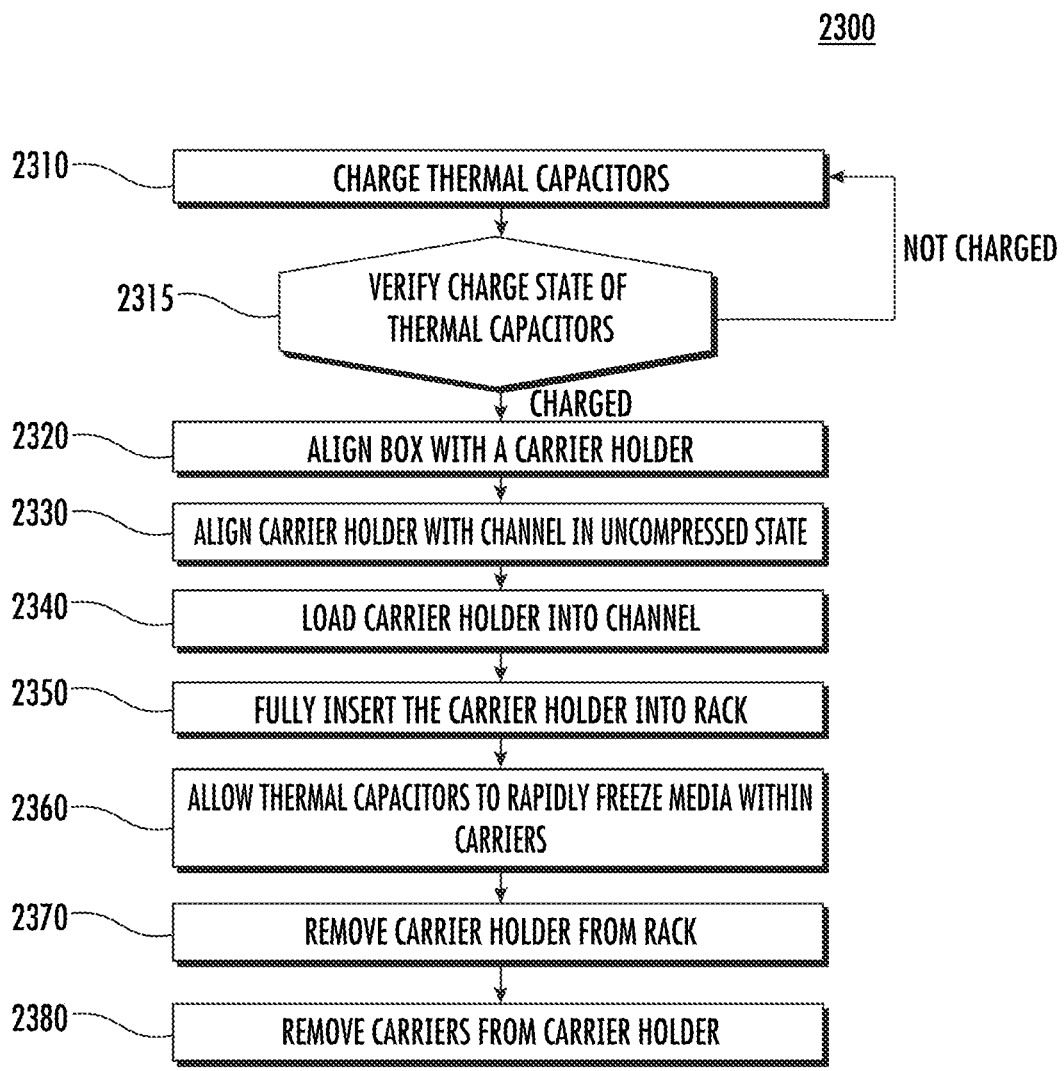
FIG. 29 is a flow chart of a method of freezing a media in accordance with an embodiment of the present disclosure.

Referring to FIG. 29, method 2300 is described in accordance with the present disclosure to freeze the media within the vessels 20. To prepare for freezing the media within the vessels 20, the thermal capacitors 600 of a frame 510 are charged (Step 2310). To charge the thermal capacitors 600, the thermal capacitors 600 are placed in an appropriate freezer, e.g., a ULT Freezer, with enough time to charge PCM within the thermal capacitors 600. As the PCM within the thermal capacitors 600 may take significant time to charge, e.g., to freeze the PCM, the thermal capacitors 600 may be placed or left in the freezer at least 12 or 24 hours before loading the boxes 310 into the frame 510 as detailed below. The thermal capacitors 600 may be charged in a freezer that will be used to freeze the boxes 310 or may be charged in a separate freezer specifically for charging the thermal capacitors 600. In some embodiments, the frame 510 is installed in a freezer with the thermal capacitors 600 fixed within the frame 510 and left in the freezer when not in use such that the thermal capacitors 600 are slowly or trickle charged between freezing operations. When the thermal capacitors 600 are charged in a separate freezer, the frame 510 or the thermal capacitors 600 are moved into the freezer for freezing prior to freezing media in the vessels 20.

In certain embodiments, the thermal capacitors 600 are formed into the frame 510 in the freezer prior to freezing the media.

As noted above, each of the thermal capacitors 600 may include a charge indicator 620 that is in signal communication with a sensor 622 that provides a visual indicia of a charge state of the thermal capacitor 600. The method 2300 may include verifying a charge state of the thermal capacitors 600 (Step 2315).

With the thermal capacitors 600 charged, the boxes 310 are loaded into a carrier holder 410 as shown in FIG. 11 (Process 2320). As noted above, the boxes 310 and/or the carrier holder 410 may include keys and keyways to orient the boxes 310 such that the transfer walls 322 of the boxes are oriented to an outside of the carrier holder 410. As shown in FIG. 11, the carrier holder 410 has six box holders 430 with three on each side of the rack 420. As noted above, the carrier holder 410 may have a differing number of boxes 310 depending on the size of the boxes 310 and/or the size of the freezer holding the frame 510. In some embodiments, the carriers 340 may be loaded into the carrier holder 410 without the use of boxes 310 such that the carriers 340 are insertable directly into the carrier holder 410. In such embodiments, the carriers 340 may be in direct contact with the thermal capacitors 600.

Figure 19:
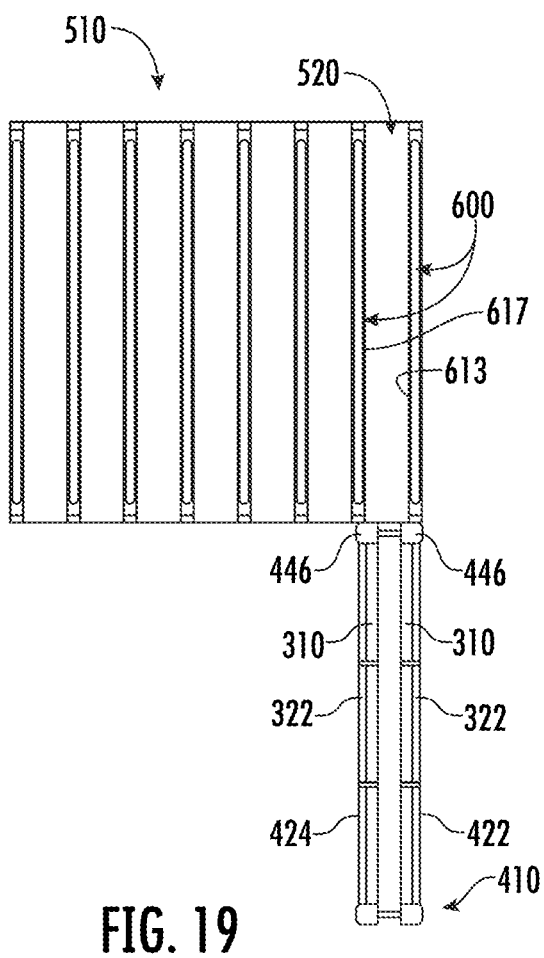
FIG. 19 is a top view of a carrier holder aligned with a channel of a frame with the carrier holder in an uncompressed configuration.

With the boxes 310 loaded in the carrier holder 410, carrier holder 410 is inserted into a frame 510. As shown in FIG. 19, the carrier holder 410 is aligned with the channel 520 in an uncompressed state (Step 2330). With the carrier holder 410 aligned with the channel 520, the carrier holder 410 is urged into the frame 510 with the bosses 446 entering the grooves 662, 672 of the thermal capacitors 600 such that the bosses 446 transitions the carrier holder 410 towards a compressed state as shown in FIG. 20 (Step 2340). As detailed above, in the compressed state, the boxes 310 are spaced apart from the thermal capacitors 600. When the carrier holder 410 reaches the fully inserted position, the bosses 446 are received in the cutouts 664 such that the carrier holder 410 expands towards the uncompressed state such that thermal walls 322 of the boxes 310 are in intimate contact with a respective contact surface 613, 617 of a respective one of the thermal capacitors 600 (Step 2350). Loading the carrier holders 410 into the frame 510 can be repeated until every frame 510 within a particular freezer is filled with carrier holders 410 or all of the boxes 310 filled with vessels 20 are loaded into the freezer.

When a freezer is filled or all the boxes 310 are loaded into a frame 510, the freezer is closed such that the freezer cooperates with the thermal capacitors 600 to rapidly freeze media within the boxes 310 (Step 2360). As detailed above, the thermal capacitors 600 may be configured to rapidly freeze media within the boxes 310 at a rate of 1° C. to 4° C. per minute until the media reaches a desired temperature, e.g., −80° C. to −50° C. The thermal capacitors 600 may allow for a large amount of media to be rapidly frozen in a traditional ULT Freezer without requiring specialty freezing equipment, e.g., 5 L or more of media.

When media reaches a desired temperature, the carrier holders 410 can be removed from the frame 510 (Step 2370) and the boxes 310 can be removed from the carrier holders 410 and loaded into a transportation container for shipping, a storage container for storage, or be returned to a ULT Freezer outside of carrier holder 410 and frame 510 for storage until use (Step 2380). In some embodiments, the boxes 310 may be placed in ultralow temperature storage and frozen to a temperature below −80° C., e.g., −150° C. or below. In certain embodiments, the boxes 310 may be stored for some period of time in the ULT Freezer before being placed in ultralow temperature storage or transported. The removal of the carrier holder 410 is the reverse of insertion with a user grasping the handle 428 of the carrier holder 410 to remove the carrier holder 410 from the frame 510. As the carrier holder 410 begins to move from the fully inserted position shown in FIG. 23, the chamfers 448 of the bosses 446 engage the grooves 662, 672 to move the carrier holder 410 towards a compressed position such that the boxes 310 disengage the contact surfaces 613, 617 of the thermal capacitors 600 until the carrier holder 410 is fully removed from the frame 510 or returned to the fully inserted position.

The carrier assemblies 1340 may increase the efficiency of distributing media to vessels, aseptically disconnecting vessels, and freezing media within the vessels. The efficiency may be gained by providing the vessels preloaded into the carrier assemblies such that a reduced number of laboratory technicians can manage the process of distributing media and freezing media from a primary vessel to a plurality of secondary vessels. The methods detailed herein reduce the steps necessary to distribute media to a plurality of secondary vessels and to load the secondary vessels into a freezer to freeze the distributed media. Such processes must be done in a timely manner so a reduction in steps and a simplification of processes may decrease an amount of time required to distribute and freeze the media. The apparatuses and methods detailed herein may allow a single laboratory technician to distribute media, disconnect vessels, load carrier assemblies into boxes, and place the boxes into a freezer within a time period necessary to preserve the media. For example, a single technician may be able to utilize the apparatus and methods detailed herein to distribute media from a single vessel to 100 secondary vessels and freeze media within the secondary vessel in an acceptable time period to preserve the media. In addition, the apparatus and methods detailed herein may allow for a reduced footprint to distribute and freeze media. This reduced footprint may allow for additional processes to be completed.

As detailed above, the boxes and secondary vessels may be perceived to be manually handled vessels up to 100 mL or even 500 mL. It is within the scope of this disclosure that the secondary vessels may be up to 16 L for manually handled vessels and 100 L for mechanically assisted vessels. The use of thermal capacitors in contact with containers may allow for the rapid freezing of these larger containers.

The thermal capacitors, boxes, systems, and methods detailed above have been described with respect to rapidly freezing media. It is contemplated that similar thermal capacitors, boxes, systems, and methods can also be used for thawing or heating media. Specifically, thermal capacitors could be filled with a PCM having a transition temperature in a range of 20° C. to 100° C. and be placed in a water bath to charge the PCM within the thermal capacitors. Once charged the thermal capacitors may be removed from the water bath and placed in contact with the boxes to rapidly heat or thaw media disposed in a container in contact with the thermal capacitor. In such applications, the thermal capacitors may provide heat to media within the container to rapidly heat or thaw the media within the container. The thermal capacitors may be charged in non-agitated liquid or water baths, agitated liquid or water baths, or recirculated liquid or water baths. The liquid or water baths may be used to heat or to cool the thermal capacitors.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed is:

1. A rapid freezing system comprising:
   a rack; and
   a plurality of thermal capacitors, each one of said thermal capacitors slidably mounted within the rack such that media to be frozen is receivable between adjacent thermal capacitors, each thermal capacitor comprising:
      a shell including a first major surface configured to contact a container including media to be frozen, defining a cavity; and
      a phase-change material (PCM) disposed within the cavity, the PCM having a transition temperature in a range of −80 degrees Celsius to −50 degrees Celsius, each thermal capacitor configured to rapidly freeze media from room temperature to at least −50 degrees Celsius at a rate of at least 1 degree Celsius per minute with the container in contact with the shell.

2. The rapid freezing system according to claim 1, wherein each thermal capacitor includes a contact surface configured to contact a container including media to be frozen, the contact surface formed of a material to enhance thermal energy transfer into or out of the PCM.

3. The rapid freezing system according to claim 1, wherein the shell is formed of aluminum and including walls defining the cavity.

4. The rapid freezing system according to claim 3, wherein the walls defining the cavity are anodized or nickel plated.

5. The rapid freezing system according to claim 3, wherein the PCM is sealed within a package disposed within the cavity.

6. The rapid freezing system according to claim 5, wherein the package is formed of fluoropolymers a silicone rubber.

7. The rapid freezing system according to claim 1, wherein at least one of the thermal capacitors includes a sensor assembly, the sensor assembly providing indicia of a charge state of the PCM within the at least one thermal capacitor.

8. The rapid freezing system according to claim 7, wherein the sensor assembly includes a sensor selected from the group consisting of a resistance temperature detector, a thermocouple, a thermistor, an optical sensor, or an ultrasonic sensor.

9. The rapid freezing system according to claim 1, wherein the rack includes an upper rail and a lower rail, the thermal capacitors are slidably mounted on the upper rail and the lower rail.

10. The rapid freezing system according to claim 1, further comprising a ULT Freezer, the rack disposed within the ULT Freezer, the plurality of thermal capacitors configured to increase a quantity of media capable of being frozen by the ULT Freezer without the ULT Freezer deviating above a maximum temperature.

11. The rapid freezing system according to claim 10, wherein the ULT Freezer with the rack is capable of freezing 5 liters of media without significant deviation from a set point temperature.

12. The rapid freezing system according to claim 10, wherein the maximum temperature of the ULT Freezer is −50 degrees Celsius.

13. The rapid freezing system according to claim 1, wherein the thermal capacitors are fixed within the rack such that a channel is defined between adjacent thermal capacitors. of the plurality of thermal capacitors.

14. The rapid freezing system according to claim 1, further comprising a carrier holder for insertion into a channel between adjacent thermal capacitors, the carrier holder having a first side and a second side, each of the first side and the second side configured to receive the container including media to be frozen.

15. The rapid freezing system according to claim 14, wherein the carrier holder has a compressed configuration in which the carrier holder has a first thickness and an uncompressed configuration in which the carrier holder has a second thickness greater than the first thickness, the first side and the second side moveable relative to one another between the compressed configuration and the uncompressed configuration.

16. The rapid freezing system according to claim 15, wherein in the compressed configuration the containers are spaced apart from the thermal capacitors and in the uncompressed configuration at least one surface of the boxes is in contact with a respective thermal capacitor.

17. The rapid freezing system according to claim 15, wherein the first thickness is less than a channel thickness of the channel and the second thickness is greater than the channel thickness.

18. The rapid freezing system according to claim 15, wherein the carrier holder includes a biasing member disposed between the first side and the second side, the biasing member urging the first side and the second side away from one another such that the carrier holder is urged towards the uncompressed configuration.

19. The rapid freezing system according to claim 18, wherein each thermal capacitor includes a groove and a cutout aligned with and positioned at each end of the groove, the carrier holder including a first boss extending from the first side and a second boss extending from the second side, the first boss and the second boss slidably received in the groove and receivable in the cutout, the carrier holder in the compressed configuration when the first boss and the second boss are received within the groove and is between the compressed configuration and the uncompressed configuration when the first boss and the second boss disposed in the notches.

* * * * *